United States Patent [19]

Hartung et al.

[11] Patent Number: 5,197,055
[45] Date of Patent: Mar. 23, 1993

[54] IDLE DEMOUNT IN AN AUTOMATED STORAGE LIBRARY

[75] Inventors: Joseph C. Hartung; David L. Patton; Dennis L. Willson; Daniel J. Winarski, all of Tucson, Ariz.

[73] Assignee: International Business Machines Corporation, Armonk, N.Y.

[21] Appl. No.: 526,483

[22] Filed: May 21, 1990

[51] Int. Cl.$^5$ .................. G11B 15/00; G11B 7/00

[52] U.S. Cl. .......................... 369/34; 369/36; 369/189; 395/425; 360/73.03

[58] Field of Search .............. 235/381; 369/34, 36, 369/189; 360/98.04, 98.05, 69, 71, 73.03, 98.01; 364/478, 479, 246.12; 395/425, 400

[56] References Cited

U.S. PATENT DOCUMENTS

| | | | |
|---|---|---|---|
| 3,774,172 | 11/1973 | Silverman | 340/173 |
| 4,077,059 | 2/1978 | Cordi et al. | 395/600 |
| 4,271,489 | 6/1981 | Siryj et al. | 369/38 |
| 4,310,883 | 1/1982 | Clifton et al. | 364/200 |
| 4,527,262 | 7/1985 | Manto | 369/33 |
| 4,538,253 | 8/1985 | Ishibashi et al. | 369/34 |
| 4,542,808 | 9/1985 | Lloyd, Jr. et al. | 364/479 X |
| 4,614,474 | 9/1986 | Sudo | 414/281 |
| 4,636,946 | 1/1987 | Hartung et al. | 395/425 |
| 4,652,939 | 3/1987 | Baumeister | 358/342 |
| 4,654,727 | 3/1987 | Blum et al. | 360/71 |
| 4,654,800 | 3/1987 | Hayashi et al. | 364/479 |
| 4,675,755 | 6/1987 | Baumeister et al. | 360/35.1 |
| 4,722,058 | 1/1988 | Nakayama et al. | 235/381 X |
| 4,739,491 | 4/1988 | Baldock | 364/478 |
| 4,754,445 | 6/1988 | Young et al. | 369/37 |
| 4,766,581 | 8/1988 | Korn et al. | 369/30 |
| 4,814,592 | 3/1989 | Bradt et al. | 235/381 |
| 4,864,438 | 9/1989 | Munro | 360/92 |
| 4,864,511 | 9/1989 | Moy et al. | 364/478 |
| 4,987,533 | 1/1991 | Clark et al. | 369/36 X |

FOREIGN PATENT DOCUMENTS 8805593 1/1988 World Int. Prop. O.

OTHER PUBLICATIONS

07/190,739k filed May 5, 1988, Clark, C. M., et al., (TU988007) Title: Method of Managing Data In A Data Storage Hierarchy And A Data...
07/190/738, Filed May 5, 1988, Waldo, E. J., (TU988009), Title: Method of Managing a Media Library.
07/190,422, Filed Aug. 8, 1990, Clark, C. M., et al., (TU988011x) Title:Data Storage Hierarchy and Method For Managing Data Therein.
07/526,256: Filed May 21, 1990, Hartung, J. C., et al., (TU989027) Title: Preemptive Demount In An Automated Storage Library.
07/526,257, Filed May 21, 1990, Monahan, C. J., et al., (TU990007) Title: Transparent Library Management.
07/525,590, Filed May 21, 1990, Monahan, C. J. et al, (TU990008) Title: Virtual Drives In An Automated Storage Library.

*Primary Examiner*—H. J. Heinz
*Assistant Examiner*—Joseph A. Rhoa
*Attorney, Agent, or Firm*—M. W. Schecter

[57] ABSTRACT

A method for selecting additional data storage media for demount in an idle automated storage library, and an automated storage library and program product therefor are disclosed. The method permits the advanced demount of storage media when one or more of the occupied peripheral storage devices remains inactive for a relatively long predetermined time. Storage media may be demounted to service a pending mount request, provided the peripheral storage devices in which the media are mounted are inactive. A storage medium may also be demounted to create an unoccupied peripheral storage device, even though no mount request is pending, when all of the peripheral storage devices are occupied and one or more of such devices remains inactive for a relatively short predetermined time. In addition, regardless of the existence of a pending mount request or of the occupancy status of the peripheral storage devices, the storage medium in each of the occupied peripheral storage devices remaining inactive for the relatively long predetermined time is demounted and transferred to a storage cell in the library. Thus, during long idle periods, the library will not continue to use the resources of inactive peripheral storage devices. Storage media may also be spun down, but not removed from the disc drive.

12 Claims, 10 Drawing Sheets

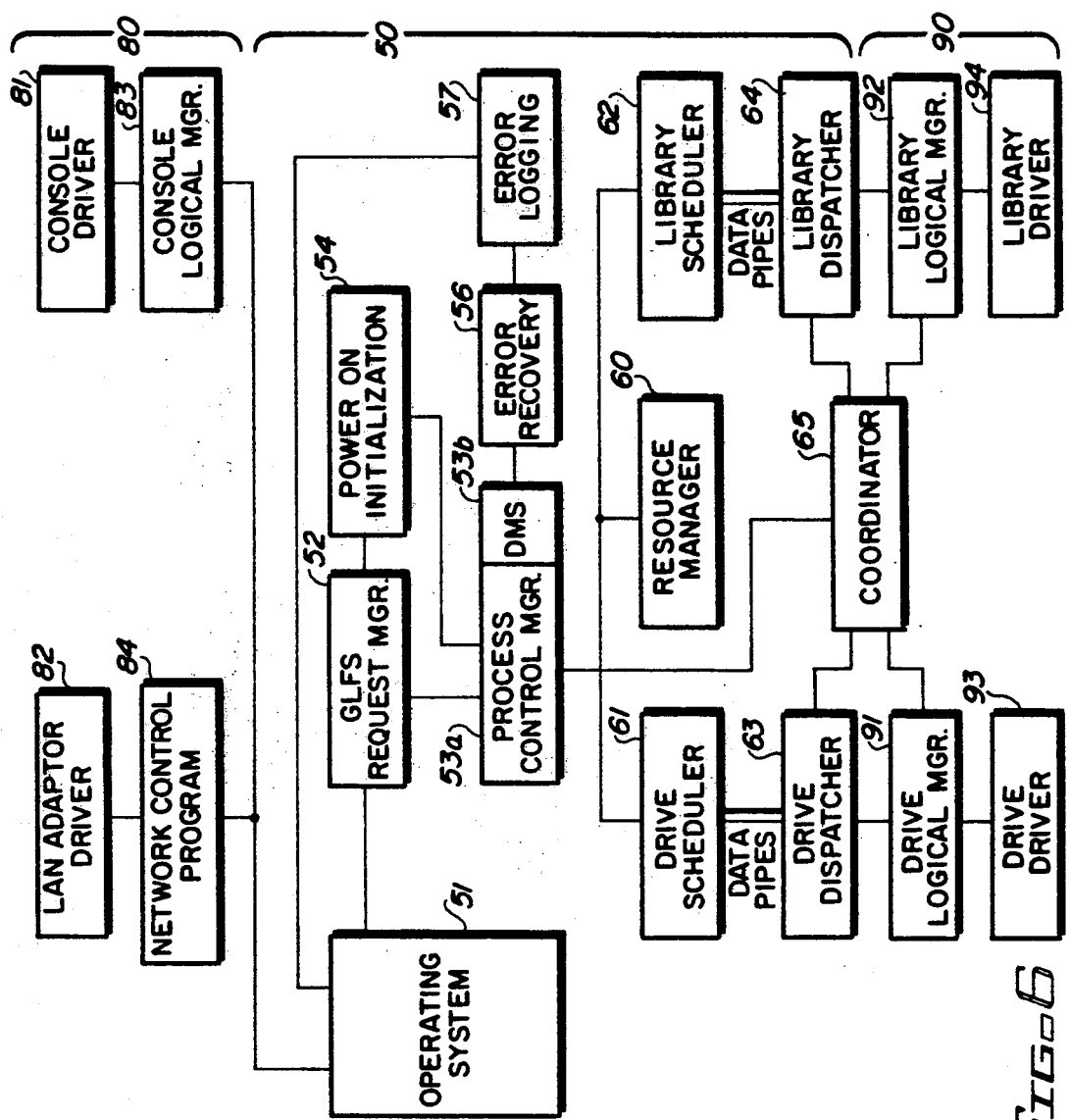
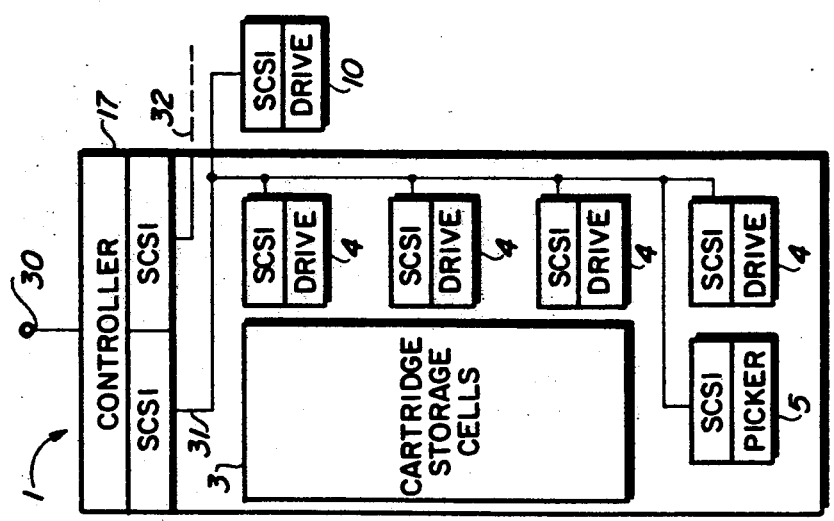
FIG. 6
FIG. 5

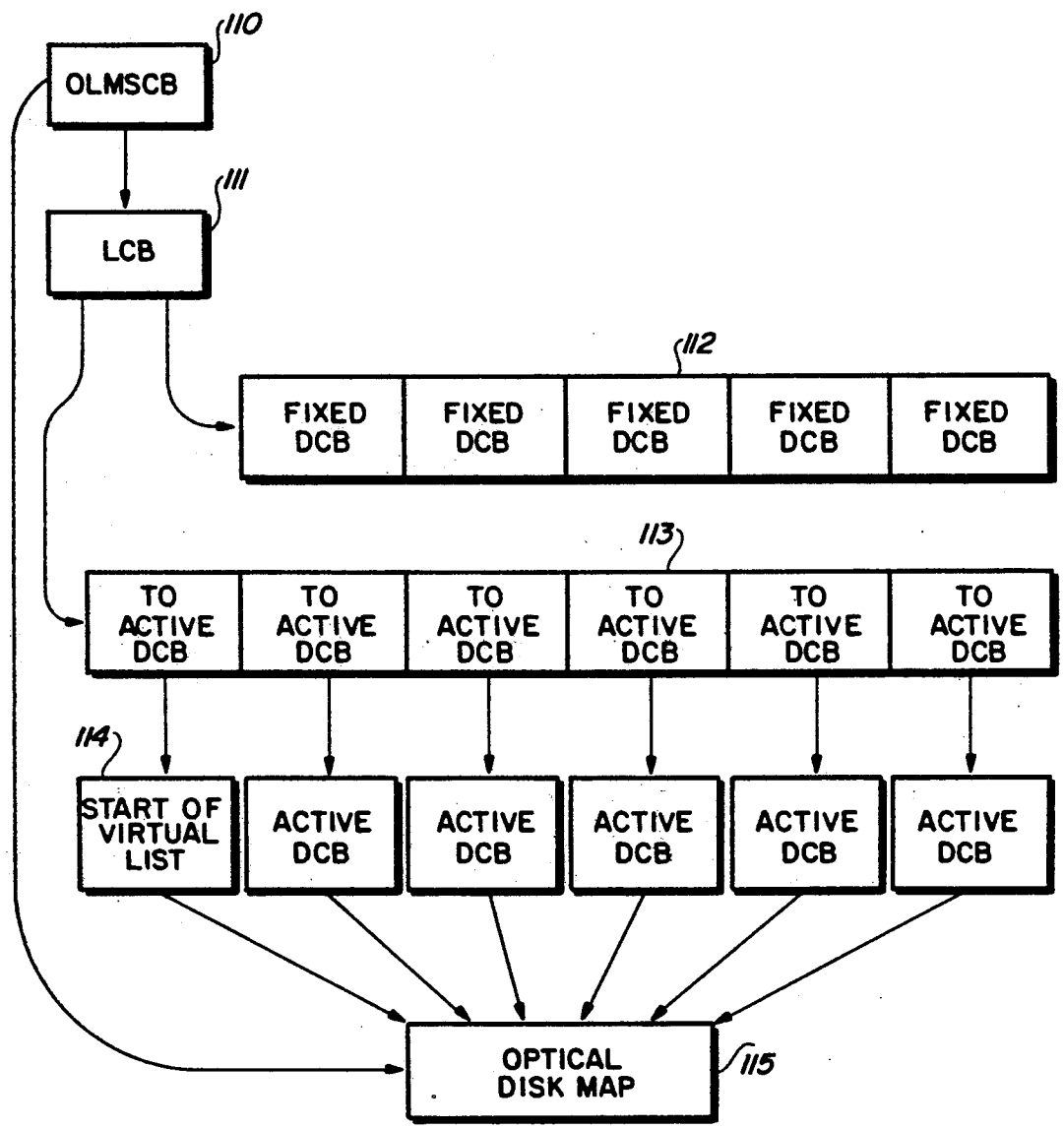

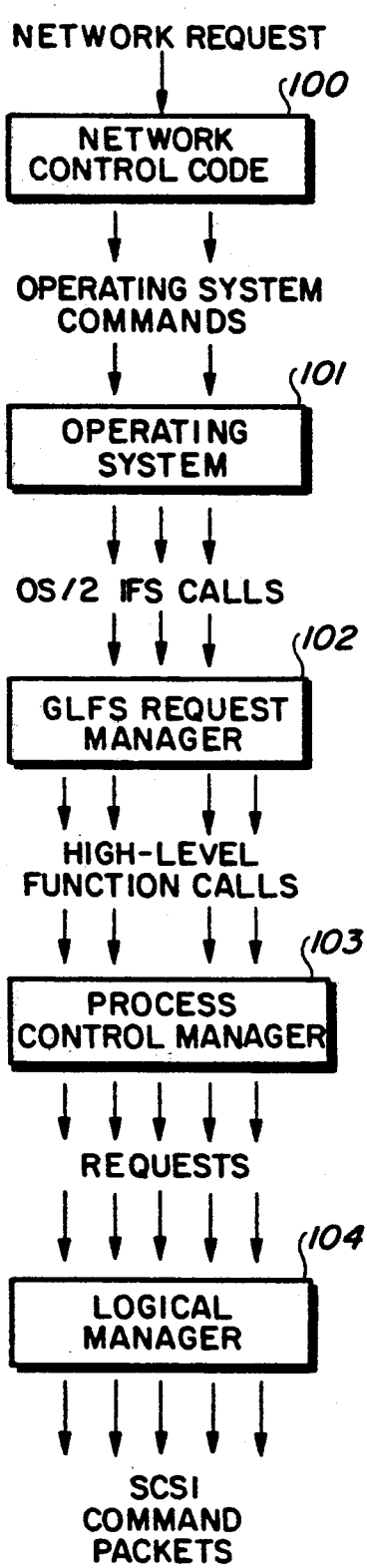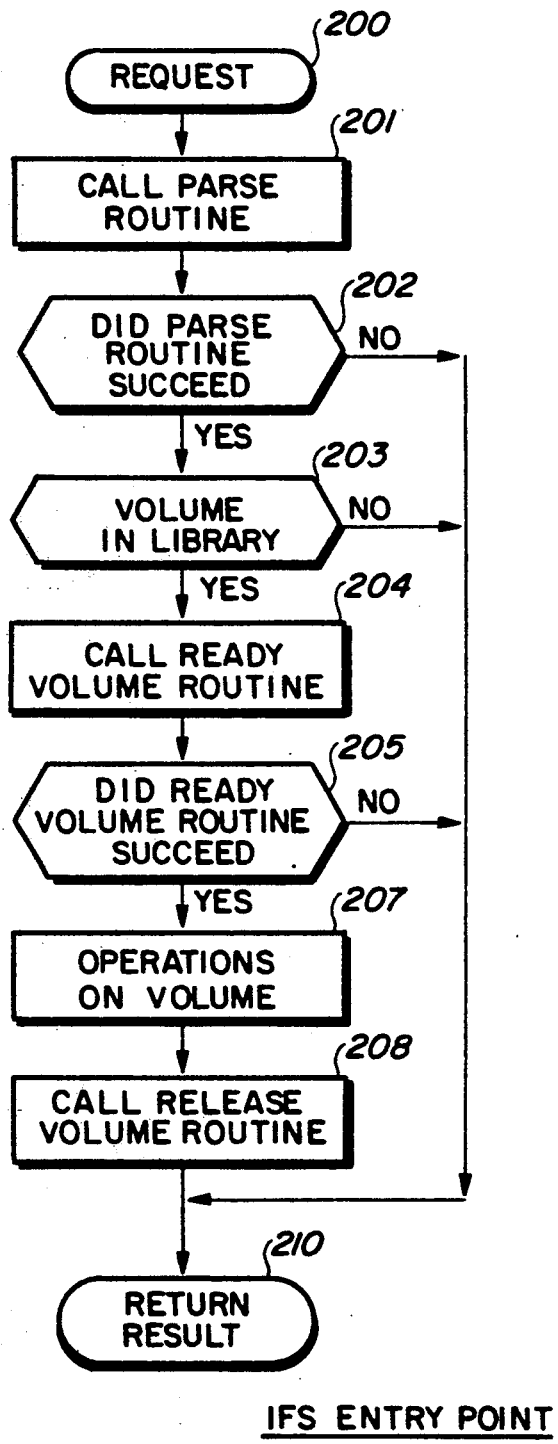
FIG. 9
FIG. 10

READY VOLUME

IN CELL

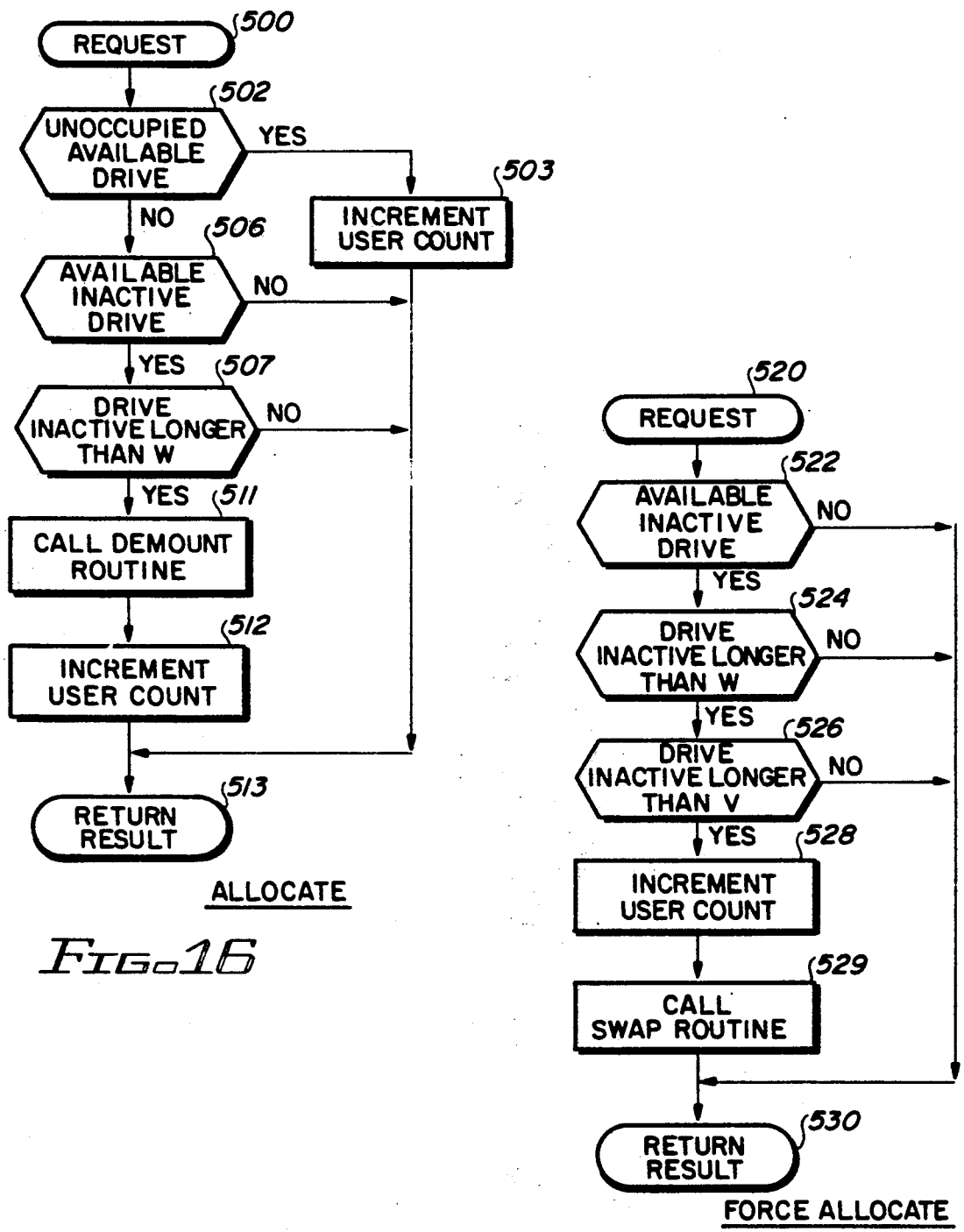
FIG. 16 ALLOCATE
FIG. 17 FORCE ALLOCATE

IDLE DEMOUNT

IDLE DEMOUNT IN AN AUTOMATED STORAGE LIBRARY

BACKGROUND OF THE INVENTION

1. Field of the Invention

This invention relates to a method for selecting data storage media for demount in an idle automated storage library, and an automated storage library and program product therefor. More particularly, the method is for the selection of data storage media for demount in an automated storage library, regardless of the occupancy status of the peripheral storage devices therein, and an automated storage library and program product therefor.

2. Description of the Related Art

Modern computers require a host processor including one or more central processing units and a memory facility. The processor manipulates data stored in the memory according to instructions provided to it. The memory must therefore be capable of storing data required by the processor and transferring that data to the processor at a rate capable of making the overall operation of the computer feasible. The cost and performance of computer memory is thus critical to the commercial success of a computer system.

Because today's computers require large quantities of data storage capacity, computer memory is available in many forms. A fast but expensive form of memory is main memory, typically comprised of microchips. Other available forms of memory are known as peripheral storage devices and include magnetic direct access storage devices (DASD), magnetic tape storage devices, and optical recording devices. These types of memory actually store data on storage media therein. Each of these other types of memory has a greater storage density and lower cost than main memory. However, these other memory devices do not provide the performance provided by main memory. For example, the time required to properly position the tape or disk beneath the read/write mechanism of the drive cannot compare with the rapid, purely electronic data transfer rate of main memory.

It is inefficient to store all of the data in a computer system on but a single type of memory device. Storing all of the data in main memory is too costly and storing all of the data on one of the peripheral storage devices reduces performance. Thus, a typical computer system includes both main memory and one or more types of peripheral storage devices arranged in a data storage hierarchy. The data storage hierarchy arrangement is tailored to the performance and cost requirements of the user. In such a hierarchy, main memory is often referred to as primary data storage, the next level of the hierarchy is often referred to as secondary data storage, and so on. Generally, the highest level of the hierarchy has the lowest storage density capability, highest performance and highest cost. As one proceeds down through the hierarchy, storage density generally increases, performance generally decreases, and cost generally decreases. By transferring data between different levels of the hierarchy as required, the cost of memory is minimized and performance is maximized. Data is thus stored in main memory only so long as it is expected to be required by the processor. The hierarchy may take many forms, include any number of data storage or memory levels, and may be able to transfer data directly between any two distinct memory levels. The transfer of data may employ I/O channels, controllers, or cache memories as is well known in the art.

Images may be included in engineering drawings, financial and insurance documents, medical charts and records, etc. Until recently, it was not possible to store image data in memory in a cost effective manner. Images can take many forms, and therefore cannot be encoded into the binary 0's and 1's of computers as easily and compactly as text. Engineering drawings are typically stored on paper, microfilm, or microfiche requiring manual retrieval when access to a drawing is necessary. The same is true for X-rays and other diagnostic medical images, bank checks used in transactions between financial institutions, insurance records, images in FAX documents and so on. Thus, despite modern computers, it is estimated that most of the world's data is still stored on paper. The cost of filing, storing, and retrieving such paper documents including image data is escalating rapidly. It is no longer acceptable to maintain rooms or warehouses stocked full of documents which must be retrieved manually when access thereto is required. Optical scanners are now capable of converting images into machine readable form for storage on peripheral storage devices, but the storage space required for the image data—although significantly less than that required for paper documents—is still quite large. Numerous disks or tapes are required for most business applications. Automated storage libraries have thus been developed to manage the storage of such disks or tapes.

Automated storage libraries include a plurality of storage cells or slots for retaining data storage media, such as magnetic tapes, magnetic disks, or optical disks, a robotic picker mechanism, and one or more internal peripheral storage devices. Each data storage medium may be contained in a cassette or cartridge housing for easier handling by the picker. The picker operates on command to transfer the data storage media between the storage cells and the internal peripheral storage devices without manual assistance. An internal peripheral storage device having a storage medium mounted therein is referred to as "occupied". Once a data storage medium is mounted in an internal peripheral storage device, data may be written to or read out from that medium for as long as the system so requires. Data is stored on a medium in the form of one or more files, each file being a logical data set. A file is considered "open" when it is reserved for access by a particular user and the storage medium upon which it resides is mounted in a peripheral storage device and ready to be accessed. For example, in an optical disk library, a file is open if it is reserved for exclusive access and the disk on which it resides is mounted in a drive and spinning. A peripheral storage device having a storage medium therein with an open file is referred to as "active", regardless of whether actual electonric transfer is occurring. A peripheral storage device is also active if the storage medium mounted therein is undergoing access under any standard operating system command not requiring that a file be open, such as a directory read. An active storage medium is generally considered to be one in an active peripheral storage device. The internal peripheral storage devices and storage cells may be considered distinct levels of a data storage hierarchy. In addition, data storage media in shelf storage (i.e. not in the storage cells, but instead outside the reach of the robotic picker without manual intervention) may be considered yet another level of a data storage hierarchy.

Automated storage libraries may also include one or more external peripheral storage devices. An external peripheral storage device is a peripheral storage device which, unlike internal peripheral storage devices, is not accessible by the picker but must instead be loaded and unloaded manually. External peripheral storage devices may be included in libraries as a convenience to the library operator. A shelf storage medium requiring brief access will not have to be inserted into the library and retrieved by the picker for mounting in one of the internal peripheral storage devices. External peripheral storage devices may also be considered a distinct level of a data storage hierarchy. Except as explicitly mentioned herein, "peripheral storage devices" hereinafter refers to internal peripheral storage devices only.

Several automated storage libraries are known. IBM Corporation introduced the 3850 Mass Storage Subsystem for the storage and retrieval of magnetic tape modules in the 1970's. More recently, several firms have introduced automated storage libraries for magnetic tape cartridges and optical disks. For example, magnetic tape cartridge libraries are disclosed in U.S. Pat. Nos. 4,654,727 and 4,864,438, and 4,864,511. Examples of optical disk libraries can be found in U.S. Pat. Nos. 4,271,489, 4,527,262, 4,614,474, and 4,766,581. The robotic picker mechanisms of these libraries include one or more grippers, each gripper capable of handling one data storage medium at a time. The '489, '262, '474 patents disclose robotic pickers having but a single gripper and the '727, '438, 511 and '581 patents disclose robotic pickers having multiple grippers. IBM also markets the 9246 Optical Library Unit which is a two gripper library.

The operation of pickers and grippers greatly effects the efficiency of an automated storage library. The selection of storage media for transfer between storage cells and peripheral storage devices, the timing of the transfers, and the selection of the location to be transferred to are among the factors which determine data access time. Normally, in single gripper libraries, the mounting of a new storage medium in an already occupied peripheral storage device requires that the already mounted medium be demounted and transferred to a storage cell and that the new medium then be retrieved from its storage cell and then mounted. In multiple gripper libraries, however, it is known to have the picker first retrieve a storage medium to be mounted with a first gripper before demounting a storage medium from a peripheral storage device with a second gripper. The storage medium in the peripheral storage device is demounted by the second gripper and immediately replaced by the storage medium in the first gripper (i.e. prior to transferring the demounted storage medium to a storage cell). By retrieving the next storage medium to be mounted in the peripheral storage device prior to emptying that device, the period of time for which the peripheral storage device is left unmounted (i.e. without any storage medium therein) is reduced. The savings can be several seconds, a significant amount in the data processing environment.

Also, in multiple gripper disk libraries, the disk to be demounted can be spun down while the disk to be mounted is being retrieved. Magnetic and optical disks normally spin at extremely high velocities while mounted to allow the read/write mechanism to rapidly locate data. The spinning of the disks must be discontinued prior to demount to avoid damaging the disks as they are removed from the drives. Stopping disks from spinning at these high velocities requires several seconds. Such "spinning down" of a disk to be demounted while another disk is being retrieved is not possible in a library having but a single gripper. Thus, while single gripper libraries may cost less than multiple gripper libraries to manufacture because of the elimination of additional gripper hardware and programming therefor, the performance of such single gripper libraries is reduced as well.

Other factors are known to effect library efficiency. It is possible to create a library wherein a mounted storage medium is simply demounted and transferred to a storage cell as soon as access to it is no longer currently required (i.e. when the peripheral storage device becomes inactive). There is always a possibility, however, that access to a storage medium will be required shortly after it is demounted. To reduce the likelihood of having to remount a medium shortly after it is demounted, known as "churn" or "thrashing", it is known to leave all mounted storage media in their respective peripheral storage devices until two conditions exist. These two conditions are the occupation of all peripheral storage devices in the library and the issuance of a mount request for a currently unmounted storage medium. The use of such conditions recognizes that there is no need to demount any storage medium so long as unoccupied peripheral storage devices are not required to accept newly requested mounts. In addition, the selection of the storage medium to be demounted to allow for a new mount is known to be made using least recently used (LRU) or least recently mounted criteria. Such selection is made to retain in mounted condition those storage media to which continued access is considered most likely. Examples of these operations can be found in commonly assigned, copending U.S. patent application Ser. No. 190,739, filed May 5, 1988.

The described conditional demount operations may at times improve performance over that of simply demounting the storage media as soon as the peripheral storage devices in which they are mounted become inactive, but nevertheless also incur performance tradeoffs which have not been addressed by the aforementioned references and products. The tradeoffs occur because the described conditional demount operations will never allow a storage medium to be demounted until the mounting of another medium is required. Some tradeoffs are related to the aforementioned significant performance disadvantage of single gripper libraries as compared to multiple gripper libraries. Delaying demount of any mounted data storage media according to the described conditions means that the aforementioned performance disadvantage cannot be avoided—once a mount request is issued, the mounted storage medium must be demounted and transferred to a storage cell before the new medium can be retrieved and mounted. This is particularly wasteful in single gripper libraries containing data storage media which are accessed randomly and thus not likely to suffer from churn. Also, mounted disks cannot be spun down during retrieval of a new disk to be mounted. The failure of any library to maintain an unoccupied peripheral storage device means that the storage device in one of such devices must at least be demounted prior to mounting a new storage medium, thereby slowing the servicing of mount requests. Even if a library has multiple grippers and can therefore delay in transferring a demounted storage medium to a storage cell, mounting of a new storage medium is delayed until the storage medium already mounted in the peripheral storage device is demounted.

Another significant tradeoff of the described conditional demount operations is that of poor library reliability. Failing to allow a storage medium to be demounted until the mounting of another medium is required will unduly burden certain peripheral storage device resources. In disk libraries, the still mounted disks continue to be spun by the disk drive motor and tracked by the disk drive servo system. In tape cartridge libraries, the still mounted tapes continue to be supported by a hydrostatic air bearing. In any libraries, certain drive electronics may also be maintained in a powered, ready state. The additional use of these drive resources results in premature aging of such resources, thereby reducing reliability. Disk drive motors, optical disk drive lasers, and tape drive air compressors will wear out at increased rates.

SUMMARY OF THE INVENTION

In view of the foregoing, it is the principal object of this invention to provide improved performance in an automated storage library, and an automated storage library and program product therefor.

Another object of this invention is to improve the management of mount/demount operations in an automated storage library, and an automated storage library and program product therefor.

Still another object of this invention is to improve the selection of storage media for demount in an automated storage library, and an automated storage library and program product therefor.

Still another object of this invention is to improve the selection of storage media for demount in an idle automated storage library, regardless of the occupancy status of the peripheral storage devices therein, and an automated storage library and program product therefor.

These and other objects of this invention are accomplished by permitting the advanced demount of storage media when one or more of the occupied peripheral storage devices remains inactive for a relatively long predetermined time. Storage media may be demounted to service a pending mount request, provided the peripheral storage devices in which the media are mounted are inactive. A storage medium may also be demounted to create an unoccupied peripheral storage device, even though no mount request is pending, when all of the peripheral storage devices are occupied and one or more of such devices remains inactive for a relatively short predetermined time. In addition, regardless of the existence of a pending mount request or of the occupancy status of the peripheral storage devices, the storage medium in each of the occupied peripheral storage devices remaining inactive for the relatively long predetermined time is demounted and transferred to a storage cell in the library. An automated storage library suitable for implementing such operations is hereinafter disclosed.

Demounting storage media, even when an unoccupied peripheral storage device already exists, improves reliability. Whenever such additional demounting occurs, the use of certain resources of the newly unoccupied peripheral storage devices is temporarily discontinued. Resources such as disk drive motors, disk drive servo systems, and hydrostatic air bearings may all be powered down. Temporarily discontinuing the use of such resources prevents premature aging, thereby improving reliability.

The foregoing and other objects, features, and advantages, of the invention will be apparent from the following more particular description of the preferred embodiment of the invention, as illustrated in the accompanying drawing.

BRIEF DESCRIPTION OF THE DRAWING

FIG. 5 is a schematic diagram of the optical disk library hardware of FIGS. 1-4.

FIG. 6 is a schematic block diagram of the system controller of the optical disk library of FIGS. 1-5.

FIG. 7 is a sample path specification for a file in the optical disk library of FIGS. 1-5.

FIG. 8 is a schematic block diagram of the internal data structures created during initialization.

FIG. 9 is a flow chart of the operations of the system controller of an optical disk library in translating a network request received at its upper interface into SCSI command packets at its lower interface according to the present invention.

FIG. 10 is a flow chart of the high level operations of FIG. 9 for a representative IFS entry point.

FIG. 14 is a flow chart of the IN DRIVE routine called in FIG. 12.

FIG. 16 is a flow chart of the ALLOCATE routine called in the aforementioned routines.

FIG. 17 is a flow chart of the FORCE ALLOCATE routine called in the aforementioned routines.

DESCRIPTION OF THE PREFERRED EMBODIMENT

Figure 1:
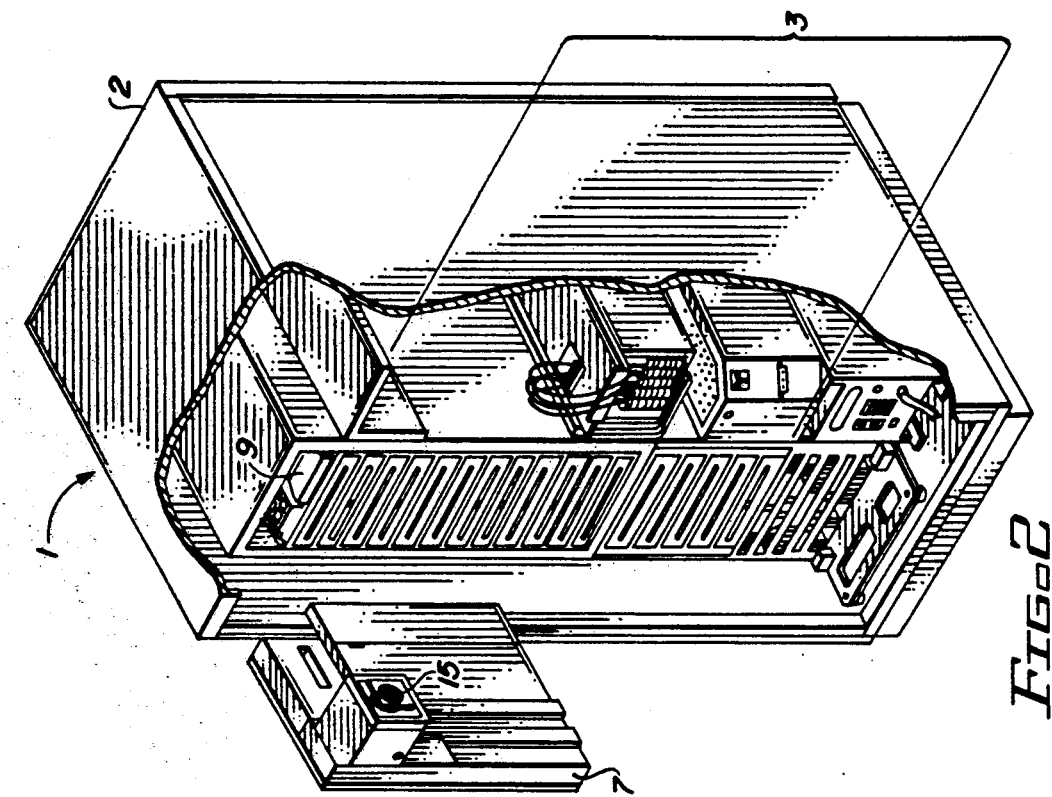
FIG. 1 is a front, perspective cut-away view of an automated optical disk library of the present invention.

Referring now more particularly to the drawing, like numerals denote like features and structural elements in the various figures. The automated storage library of the invention will be described as embodied in an optical disk library. Referring to FIGS. 1-4, various views of such an optical disk library is shown. The library 1 includes a housing 2 enclosing most of the working parts of the library and having front and rear door panels (not shown) for interior access. Library 1 further includes a plurality of optical disk storage cells 3 and a plurality of internal optical disk drives 4. Each storage cell 3 is capable of storing one optical disk having data recorded on one or both sides thereof. The data stored on each side of a disk is referred to as a "volume". In the preferred embodiment, library 1 includes 144 storage cells 3 arranged in two 72 storage cell columns and up to four optical disk drives 4. The optical disks may include ablative, phase-change, magneto-optic, or any other optical recording layers and may be read-only, write-once, or rewritable, as is known, so long as they are compatible with optical disk drives 4. In addition, the optical disks may be recorded in a spiral or concentric track pattern. The precise recording format is not part of the subject invention and may be any known in the art. A robotic picker 5 includes a single gripper 6 capable of accessing an optical disk in any of storage cells 3 or drives 4 and transferring such optical disks therebetween. In the preferred embodiment, the optical disks are configured in cartridges for easy handling by gripper 6 and are 5 and ¼ inch form factor disks, but in alternative embodiments could be any size compatible with drives 4 and gripper 6.

Figure 2:
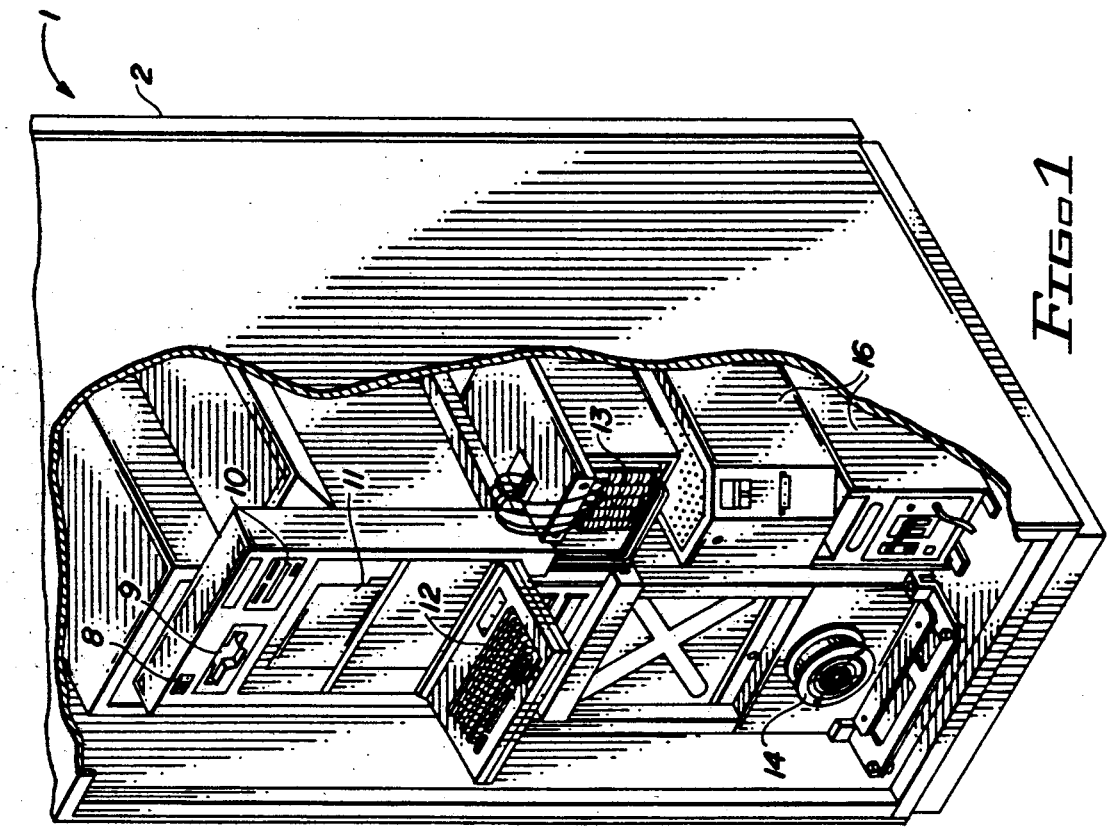
FIG. 2 is the same view as in FIG. 1 except that the console panel has been swung aside and the fan has been removed.
Figure 4:
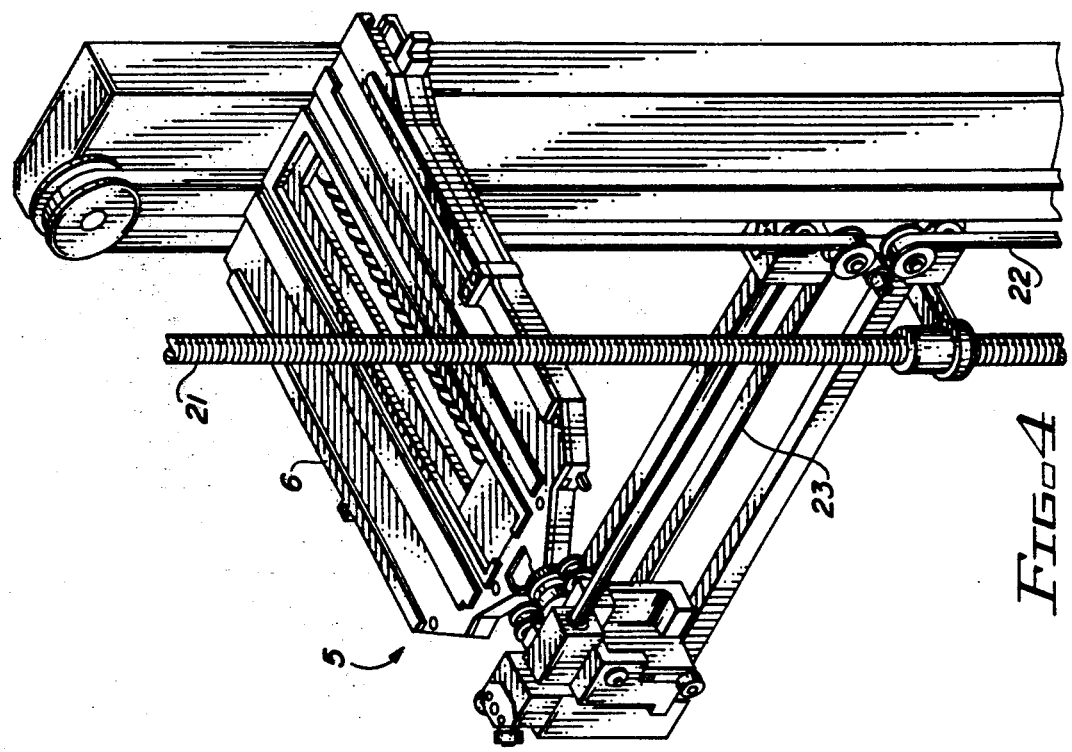
FIG. 4 is a magnified view of the robotic picker and gripper of FIG. 3.
Figure 3:
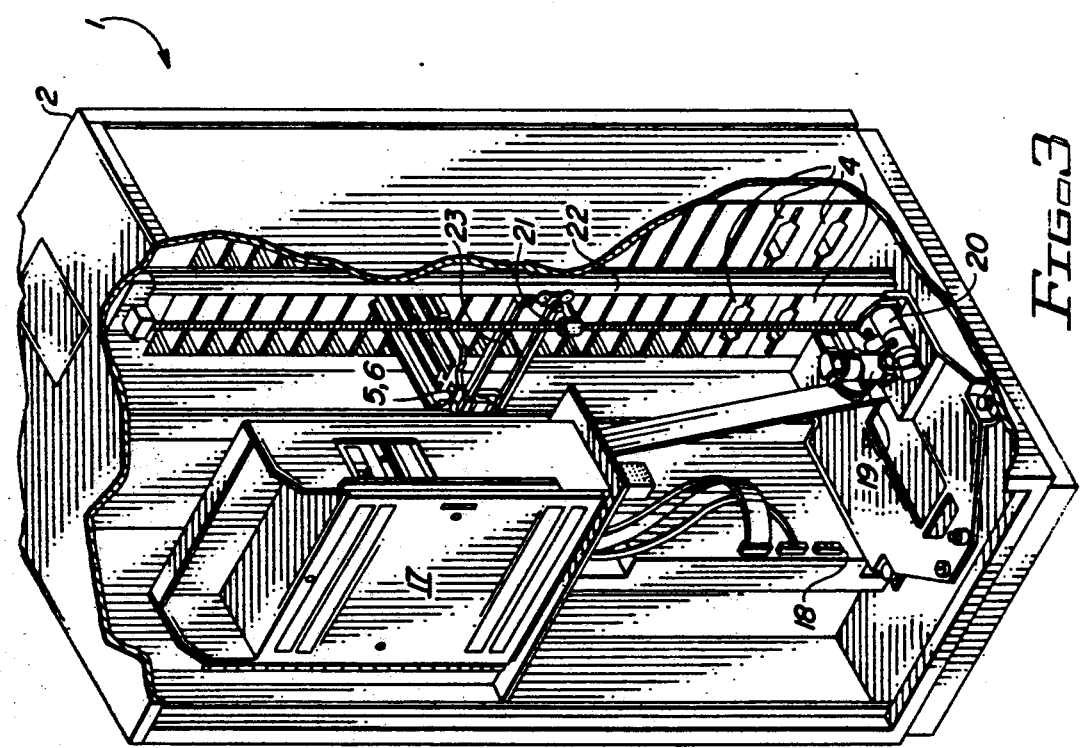
FIG. 3 is a rear, perspective cut-away view of the automated optical disk library of FIGS. 1 and 2.

Although the front face of housing 2 is not shown in FIG. 1, certain portions of library 1 protrude through such front face of housing 2 for operator access. These portions are part of a console door 7 and include all or part of a power indicator/switch 8, an entry/exit slot 9, an external optical disk drive 10, a console 11, and a keyboard 12. Console door 7 can be swung aside to allow access therebehind, when necessary, as shown in FIG. 2. Slot 9 is used for inserting optical disks to or removing optical disks from library 1. Commands may be provided by an operator to library 1, via keyboard 12, to have picker 5 receive an optical disk inserted at slot 9 and transport such disk to a storage cell 3 or drive 4, or to have picker 5 retrieve an optical disk from a storage cell 3 or drive 4 and deliver such disk to slot 9 for removal from library 1. Console 11 allows an operator to monitor and control certain operations of library 1 without seeing inside housing 2. External optical disk drive 10, unlike drives 4, cannot be accessed by gripper 6. Drive 10 must instead be loaded and unloaded manually. Library 1 also includes an optical disk drive exhaust fan 14, an external disk drive exhaust fan 15, and power supplies 16.

Once library 1 is powered on, commands received at keyboard 12 are forwarded to a system controller 17. In the preferred embodiment, system controller 17 is an IBM PS/2 Model 80 personal computer using the OS/2 operating system. The IBM PS/2 model 80 personal computer includes main memory and one or more storage media, such as those in fixed or floppy disk drives. System controller 17 issues instructions to drives 4, external drive 10, and picker 5 as will be described. Drive controller cards 13 and picker 5 controller card 18 convert known small computer system interface (SCSI) command packets issued by system controller 17 into the electromechanical action of drives 4, external drive 10, and picker 5. The movement of picker 5 within library 1 is X-Y in nature. Movement in the vertical direction is driven by a vertical direction motor 19 and movement in the horizontal direction is driven by a horizontal direction motor 20. Motor 19 turns a lead screw 21 to move picker 5 vertically. Motor 20 turns belts 22 and 23 to move picker 5 horizontally. In addition, picker 5 may be rotated to bring either side of an optical disk within the grasp of gripper 6 to an upright position. The remaining physical features of library 1 are not shown in the drawing, or are shown but not labeled for the purpose of simplification, but are well known.

Referring to FIG. 5, the system connections of library 1 will now be described. System controller 17 is attached to one or more host/system processors 30 to receive input therefrom and to transmit output thereto. System processor 30 can be host central processing unit (CPU), such as an IBM 3090 mainframe processor using the MVS or VM operating system or IBM AS/400 midrange computer using the OS/400 or AIX operating system, or a network of processors, such as IBM PS/2 personal computers using the OS/2 or DOS operating system and arranged in a local area network (LAN). The connections to system processor 30 are not shown, but are well known. If system processor 30 is an IBM 3090 mainframe processor, the connection could be made using an IBM System/370 channel attachment according to the interface described in IBM Document #SA22-7091-00, "IBM Channel-to-Channel Adapter", Jun., 1983, IBM Document #GA22-6974-09, "IBM System/360 and System 370 I/O Interface Channel to Control Unit Original Equipment Manufacturers Information", Feb. 1988, and IBM Document #SA22-7085-01, "IBM System/370 Extended Architecture Principles of Operation", Jan. 1987, each of which are hereby incorporated by reference. If system processor 30 is an IBM AS/400 midrange . computer, the connection could be made using a direct, SCSI interface attachment wherein library 1 is directly controlled by the host system according to ANSI standard X3T9.2/86-109 rev. 5, hereby incorporated by reference. If system processor 30 is a plurality of IBM PS/2 personal computers arranged in a LAN, the connection could be made using the NETBIOS control program interface of the IBM Token Ring Network LAN attachment, according to the protocols described in IBM Document #SC21-9526, "Distributed Data Management Level 2.0 Architecture Reference", Mar., 1989, hereby incorporated by reference. The preferred embodiment of library 1 will hereinafter be described as used as a file server in a LAN environment wherein library 1 appears to the system as a shared, general storage device.

System controller 17 is attached to drives 4, picker 5, and external optical disk drive 10 via known single-ended SCSI connections, including SCSI bus 31. In an alternative embodiment, system controller 17 may be similarly connected to another physical box to direct the operations of such other box, not shown in the drawing. The other box would be essentially identical to that shown in FIGS. 1-4, except that the other box would not physically include a system controller therein, but would instead be controlled by system controller 17 via SCSI bus 32. The logical subsystem including both physical boxes, one box with a system controller and one box without a system controller, is considered to be a single library. In addition, for use in certain environments, two system controllers can be connected via an RS-232 interface (not shown) to create a library including two boxes with system controllers and two boxes without system controllers, and so on.

Referring to FIG. 6, a functional component level description of system controller 17 will now be provided. Generally, system controller 17 is designed to support major library functions such as creating and deleting files, writing to and reading from the files, moving optical disks between storage cells 3, drives 4, and slot 9, and providing statistics on usage and errors. Volumes in the library appear as subdirectories in the root directory of a single drive. Labels assigned to each volume represent the subdirectory name. System processor 30 is able to read the root directory, but cannot store files in the root directory. Any paths accessed on a volume appear as paths under the subdirectory element that represents the volume label.

Standard path protocol known in the personal computer environment is used to access files in library 1. The path format is shown in FIG. 7 and includes path elements 35-37 and 39. Of the path elements, "d:" is the designator 35 for library 1, "volid" is the volume label 36, "path1 path2" etc. is the normal subdirectory path specification 37, and "file.ext" is the filename and extension 39. Backslashes are used to separate path elements. Designator 35 for library 1 is a letter and colon as is used for any peripheral storage device in the personal computer environment, such as the commonly used "c:" for a fixed disk drive. Volume label 36 appears as a subdirectory element in the root directory of the designated hardware. Because the first apparent subdirectory element is actually the volume identifier and the remaining subdirectory elements are the actual path 37, library 1 appears to system processor 30 as does any single, peripheral storage device. Library 1 requires no instruction as to the physical location of the volume within library 1, the drive 4 in which to mount the volume, etc. Instead, system controller 17 makes all such determinations and directs the appropriate actions. Library management is thus transparent to users.

A generic library file server (GLFS) 50 controls the library with a set of generic, intermediate hardware commands through a formally defined interface which will be described later herein. Data is manipulated by GLFS 50 at the logical record level allowing for data access in quantities spanning from a single byte to complete, variable length data objects. An operating system 51 mediates the flow of control and directs incoming operating system commands from the external interfaces into the library subsystem. Operating system 51 can be any of several known operating systems and in the preferred embodiment is the OS/2 operating system. The use of the OS/2 operating system generally allows for control of library 1 through standard fixed disk operating system commands. Library control is directed through a unique command, DosFsCtl. This command is used to support initialization, entry/exit of an optical disk from library 1, read/store the library map file, mount/demount an optical disk in drive 10, enable/disable virtual drive option, etc. Drive control is directed through a unique command, DosDevIOCtl. The remainder of the programmed control for library 1 is retained in microcode which is uploaded into the main memory of system controller 17 from a storage medium resident therein at initialization. In alternative embodiments, some function required to support the microprogrammed control may also be provided as a utility to the operating system running in system processor 30.

The OS/2 operating system includes several advanced operating systemconcepts integral to system controller 17. These advanced concepts are dynamic link libraries, installable file systems, and multitasking. A dynamic link library (DLL) is a file containing a set of functions each of which may be dynamically loaded as needed. Normally, a program is compiled and linked with the compiled program code of all of the functions the program might invoke before it can be executed. A DLL permits a program to invoke functions compiled and linked into independent modules of program code. OS/2 includes a set of DLL modules that can be invoked as required. Using a custom DLL module, OS/2 can be made to control non-standard storage devices. The custom DLL module is known as an installable file system (IFS). Each function supported by an IFS is known as an entry point. For additional information on installable file systems, see IBM Document #G362-0001-03, "IBM Personal Systems Developer", Fall, 1989, hereby incorporated by reference. In the preferred embodiment, GLFS 50 is implemented as an IFS to the OS/2 operating system with prescribed entry points. Another important aspect of the OS/2 operating system is multitasking. Multitasking is the ability of a system to run multiple programs concurrently. The system processor's time is apportioned amongst tasks each appearing to be running as if no other tasks are present. A separate environment is maintained for each task; memory and register contents for each task are isolated to avoid interference with each other. A task and its associated environment is referred to as a "thread". Programs can include a code area and a data area in the main memory of the IBM PS/2 model 80 personal computer. The code area is the section of memory containing the instructions being executed for any given thread. The data area is the section of memory (or registers) that is manipulated during execution of the instructions. Because the same code area may be used for several threads, each thread may point to the same code area for execution but includes its own isolated data area.

The upper interface translator 80 is responsible for translating between upper interface commands and those of GLFS 50. The lower interface translator 90 is responsible for translating between the commands issued by GLFS 50 and those of the lower interface. Translators 80 and 90 are each implemented as distinct linkable modules with clearly defined interfaces, thereby permitting easy attachment of library 1 to new upper and lower interfaces. The only impact of attachment to a new interface is the creation of a new portion of translators 80 and 90—the generic nature of GLFS 50 allows it to remain unchanged.

The upper interfaces of library 1 include the library configuration, map, and system performance files, console 11 (and keyboard 12), and the network interface. The library configuration, library map, and system performance files are not shown in the drawing, but are stored on the fixed disk drive of system controller 17. These files are maintained by the library operator or maintenance personnel. The library configuration file lists various characteristics of the hardware configuration of library 1, such as the number of physical boxes in library 1, the number of drives 4 and 10 in each physical box, whether a drive is an internal drive 4 or an external drive 10, the number of storage cells 3 in each physical box, the SCSI addresses of each picker 5 and drive 4 or drive 10, etc. The library map file lists various characteristics of the optical disks in library 1, such as the volume label of each optical disk in library 1, the address of the home storage cell for each optical disk in library 1, free space information for each optical disk, and certain usage statistics for each optical disk, such as the number of mounts, the date and time of last access, etc. System controller 17 uses the library configuration and map files to identify the number and arrangement of resources in the library, and adjusts the files as the status of the resources in library 1 changes. The system performance file lists operator specified parameters such as the virtual drive option parameter U, minimum virtual drive eligibility time V, minimum demount eligibility time W, preemptive demount eligibility time X, and idle demount time Y, all of which are defined later herein. Console 11 is used to exhibit the ongoing status of the library components and make commands and utility functions, such as error reporting, available to the operator. Keyboard 12 allows the operator to make manual input to library 1, such as in response to information received via console 11. Console 11 and keyboard 12 are linked to GLFS 50 by console driver 81 and console logical manager 83. The network is linked to LAN adapter driver 82 and NETBIOS network control program 84. The network interface allows a processor on the network to remotely gain access to library 1, which acts as a file server thereto.

GLFS request manager 52 is the interface to operating system 51 and responds to the same set of entry points that the OS/2 operating system uses to communicate with any IFS. GLFS request manager 52 is responsible for breaking down operating system commands to accomplish library functions, which it does by calling routines found in the process control manager (PCM) 53a to accomplish each step. PCM 53a is a set of utility routines, some of which require the generation of request blocks, that assist the system in breaking down and processing commands. The routines parse directory path strings, enter optical disks into the library, locate volumes, allocate drives to a volume, flip optical disks so as to present the volume on the opposite side for mounting, mount volumes, demount volumes, exit optical disks from the library etc. and will be described further where appropriate. The directory management scheme (DMS) 53b is a module of code which satisfies the IFS file specification for monitoring the open/closed status of the user files in library 1, as is well known, and is used to manipulate such user files. Use of the IFS interface in such an internal module allows for easy adaptation of external IFS-style implementations of directory management schemes.

The power on initialization (POI) module 54 manages the power on and reset functions of the controller and is invoked by operating system 51 at initialization. POI module 54 is responsible for functions such as determining and reporting the results of component self-testing and reading the library configuration and status files. Errors are processed by an error recovery module 56 and an error logging module 57. Recovery module 56 processes all errors, including dynamic device reallocation and retries of device commands. Logging module 57 is responsible for saving error information and reporting it to the operator via console 11.

The resource manager 60 dynamically allocates and deallocates control blocks in the data area of system controller 17, including request blocks, drive control blocks, and error information blocks. Request blocks are used to request a hardware event for drives 4 or picker 5. Drive control blocks are used to store status information relating to drives 4, as will be described later herein. Error information blocks are used to store the information needed to report, isolate, and possibly retry an error. The allocation and deallocation of control blocks is accomplished using a list of the free space available in the main memory of the IBM PS/2 model 80 personal computer maintained by resource manager 60. Note that both error recovery module 56 and resource manager 60 are connected to most of the components of system controller 17 shown in FIG. 6, such connections not being shown for simplification.

The schedulers 61 and 62 are responsible for verifying some of the contents of the request blocks and entering them into the pipe for the hardware device that will process the request. A pipe is a queued data path leading from one thread to another and can be accessed by any thread knowing the assigned identifier of the pipe. The dispatchers 63 and 64 are responsible for validating the request blocks, ensuring that the requests are ready to be executed, and dispatching the request as appropriate to the drive logical manager 91 and the library logical manager 92. The coordinator 65 is responsible for coordinating request execution for dispatchers 63 and 64. The coordinator accomplishes such using a table having an entry for each request block received from PCM 53a. Each entry lists the supporting request blocks associated with a particular request block. A request requiring the prior completion of another request is referred to as "dependent", the request that must first be completed is referred to as "supporting". Coordinator 65 withholds execution of dependent request until associated supporting requests have been executed. If a supporting request fails execution coordinator 65 rejects requests dependent thereon.

Logical managers 91 and 92 are responsible for translating the generic library commands in the form of request blocks into the equivalent device level commands in the form of SCSI data packets. Logical managers 91 and 92 are also responsible for receiving hardware status information from the drive driver 93 and the library driver 94 respectively. Drivers 93 and 94 directly manipulate the hardware and physical memory. Drivers 93 and 94 perform all communications with their respective hardware and also respond to interrupts. Logical manager 91 and drive driver 93 control drives 4, logical manager 92 and library driver 94 control picker 5. Although not shown in FIG. 6 for simplicity, there are actually multiple drive dispatchers 63, drive logical managers 91, and drive drivers 93—one set for each drive 4 or 10 in library 1. Each set is connected to a different data pipe.

METHOD OF OPERATION

Initialization of library 1 is accomplished using operating system 51, GLFS request manager 52, resource manager 60, and POI module 54. After self-testing of the library hardware to verify correct function, operating system 51 is loaded and uses the OS/2 CONFIG.SYS file to set the operating system parameters and load drivers. Operating system 51 then generates an initialization command which is passed to GLFS request manager 52 and then on to POI module 54. POI module 54 reads the library configuration, map, and system performance files, creates the necessary internal data structures in the main memory of the IBM PS/2 model 80 personal computer, and initiates separate threads for each hardware component of library 1 specified in the library configuration file. Resource manager 60 initializes internal tables used in memory management. POI module 54 then queries system controller 17 and controller cards 13 and 18 for power-on self-test results and reports any problems to error recovery module 56. Any errors detected during initialization are logged by error logging module 57 and, if possible, recovered by error recovery module 56. When system controller 17 is in a ready state, the system is receptive to activity from console 11 or the network interface.

Referring to FIG. 8, the internal data structures include the optical library main system control block (OLMSCB) 110, one or more library control blocks (LCB) 111, fixed drive control blocks (DCB) 112, an active DCB pointer array 113, active DCBs 114, and an optical disk map 115. Pointers are represented by arrows in FIG. 8. OLMSCB 110 includes the number of physical boxes in library 1, the virtual drive option parameter U, minimum virtual drive eligibility time V, a pointer to the optical disk map, and a pointer to a LCB 111 for each physical box in library 1 (for convenience, only one such LCB is shown in the drawing). Each LCB 111 includes for the respective physical box the operational status of picker 5 (on-line, off-line, failed), the number of drives 4 and 10 therein, the SCSI address of picker 5 therein, the number of storage cells 3 therein, the address of each storage cell 3 and slot 9 therein, the minimum demount eligibility time W, the preemptive demount eligibility time X, the idle demount time Y, and a pointer to fixed DCBs 112 for each drive 4 or 10 therein. Each LCB 111 also includes a pointer to active DCB pointer array 113, which in turn includes a pointer to an active DCB 114 for each drive 4 or 10 therein.

Five fixed DCBs 112 are shown in the drawing, one for each drive 4 and drive 10 in the preferred embodiment. Each fixed DCB 112 includes certain drive specific information about drives 4 and 10 which is "fixed" in that it does not change as optical disks are manipulated about library 1. Such information includes for the respective drive the operational status of the drive including a usage attribute indicating whether use of the drive is restricted to certain functions (such as write only). Fixed DCBs 112 are used as permanent records of such information to create active DCBs 114 as optical disks are manipulated about library 1, as will be described.

Six active DCB pointers 113 and active DCBs 114 are shown in the drawing, one for each drive 4 and drive 10 in the preferred embodiment, and one for the virtual list, which is a linked list of the access records for certain volumes, as will be described. Active DCBs 114 include certain volume specific information about drives 4 and 10 and the virtual accesses. The information is "active" in that it does change (i.e. it is updated) as optical disks are manipulated about library 1. Such information includes for the respective drive or virtual access the appropriate information from fixed DCBs 112 and also the occupancy status of the drive (whether or not there is an optical disk mounted therein), usage statistics such as the last access time and user count for a volume therein or virtual access, and an index into the optical disk map for the entry therein which describes the volume mounted in the drive or virtual access. The index into the optical disk map is used by DMS 53b to locate a volume in library 1, as required. The user count is the number of current accesses ongoing for a volume, an access being an open file or any standard operating system command not requiring that a file be opened, such as a directory read.

Optical disk map 115 includes an entry for each storage cell 3 in library 1. An entry for an empty storage cell 3 is blank. An entry for a full storage cell 3 lists the owner of the disk therein, the home storage cell 3 and current location of the disk, and for each volume on the disk, the volume label, the number of mounts, the available free space, and other usage statistics. The aforementioned data structures also include other information required for the operation of library 1, although not explicitly described for simplicity, as is known in the art.

Referring to FIG. 9, the operations of system controller 17 will now be described. When a request is received from the network interface, the network control code will convert the request into a set of standard OS/2 operating system commands at step 100. Operating system 51 will then issue the appropriate operating system calls to process the operating system commands at step 101. GLFS request manager 52 receives the calls and breaks them down into simpler functions. For each function, GLFS request manager 52 will call a routine in PCM 53a and/or DMS 53b and pass the appropriate subset of the data required for the routine as parameters at step 102. For each routine requiring hardware activity, PCM 53a and/or DMS 53b at step 103 calls resource manager 60 to create a hardware level request block, issues such block to schedulers 61 and 62, and informs coordinator 65 of any hardware dependencies to allow for the proper sequencing of the requests. PCM 53a also returns control and status information to GLFS request manager 52 as each routine is completed.

After checking the list of free space available in the main memory of the IBM PS/2 model 80 personal computer, resource manager 60 allocates the required memory space for the request block. The routines calling resource manager 60 provide most of the information for a control block, resource manager 60 fills in certain additional information such as a control block identifier and a request block identifier. Drive scheduler 61 and library scheduler 62 receive all hardware event requests as request block identifiers and forward them to the data pipes connected to drive dispatcher 63 and library dispatcher 64 respectively. Dispatchers 63 and 64 continually check their respective data pipe for the existence of a request block identifier. After receiving a request block identifier, dispatchers 63 and 64 call coordinator 65 to determine if the request block is ready to be executed. Coordinator 65 checks the table of request block dependencies and prevents dispatchers 63 and 64 from issuing the request block identifier until all supporting request blocks have been completed. When all request block dependencies have been met, the request block identifier is issued to the respective logical manager 91 or 92.

At step 104, logical managers 91 and 92 receive the request block identifiers, construct the necessary SCSI hardware command packets to accomplish the requests, and issue the packets to drivers 93 and 94. The hardware then physically performs the requests. As each request is completed logical managers 91 and 92 signal such completion. Dispatcher 63 or 64 then issues the identifier of the next request block to the respective logical manager 91 or 92.

Generally, library mount/demount operation will continue on an as needed basis as long as there are existing requests to mount volumes. When a volume is first mounted in a drive 4 or 10, an active DCB 114 pertaining to the access of such volume is created. The active DCB is created by copying the drive specific information relating to the drive 4 or 10 in which the volume is mounted from the fixed DCB 112 into a block of memory and adjusting the appropriate pointers. During access to the volume, the volume specific information about such access is updated and stored in the active DCB 114. If the volume is demounted, the volume specific information is deleted from active DCB 114, except for the occupancy status information, to indicate that the respective drive 4 or 10 is again empty. When a volume is again mounted in the respective drive 4 or 10, the active DCB 114 is again updated as necessary with the appropriate volume specific information, and so on.

Volumes are demounted to free a drive 4 to service an existing mount request, thereby maintaining drives 4 in an occupied state. Such occupancy maximizes the amount of data ready for access. When there are no pending mount requests, however, drives 4 may be preemptively demounted to ensure the existence of an unoccupied drive 4 to service forthcoming mount requests, and to reduce aging of drives 4 during idle periods. If all drives 4 are occupied, one drive 4 may be emptied, as will be described. In addition, the activities of drives 4 are periodically reviewed to determine if the volumes in any of the occupied drives 4 should be preemptively demounted because library 1 is relatively idle, as will also be described. During normal library operations a drive 4 will therefore be empty only after the preemptive demount of a volume. The criteria for selecting volumes for preemptive demount when all drives 4 are occupied and there is no pending mount request is different from those criteria used during the periodic review of the activity of drives 4.

A drive 4 can physically write to or read from only one optical disk at any given time. A request to mount a volume at a time when there are no unoccupied drives 4 normally results in the rejection of the request. However, when the virtual drive option is enabled by setting the virtual drive option parameter U to one, a request to mount a volume when all drives 4 are occupied allows for access to more volumes than there are drives 4 by temporarily demounting the least recently used volume. The temporarily demounted volume is referred to as "swapped out" and the newly mounted volume is referred to as "swapped in". The drive specific information for the drive 4 is deleted from the active DCB 114 but the volume specific access information for the temporarily demounted volume is retained therein. The active DCB 114 for the temporarily demounted volume is then retained in a special form of active DCB 114 referred to as the virtual list. The virtual list DCBs differ from other active DCBs in that they contain pointers to each other to create a linked list. The virtual list permits resumption of the operations on the volume by remounting at the next volume mount request or, alternatively, caching can be used to continue access without remounting. Upon remounting of the volume, the appropriate virtual list DCB is deleted from the linked list and the volume specific information copied into the active DCB 114 for the appropriate drive 4. Because such access information is retained, a volume that has been swapped out under the virtual drive option is still considered active and under access. Also, remounting of a volume that has been swapped out can occur in any drive 4 so long as the access information is provided to the active DCB 114 for the respective drive; a volume access is not tied to the original drive 4 in which the volume is mounted. A volume that has been swapped out will not logically appear to be in its home storage cell 3 as remounting must be distinguished from the mounting of a volume that has not been swapped out. The actual number of drives 4 in the library is thus transparent to users. In alternative embodiments, additional virtual eligibility option parameters can b used to specify only certain volumes as eligible for swapping to prevent churn for volumes frequently accessed.

Referring to the drawing, the high level operations of system controller 17 will now be described in further detail beginning at a representative IFS entry point into GLFS 50 requesting access to a specific, designated volume. The description refers to a series of routines of PCM 53a. The PARSE routine is used to separate volume label 36 from the remainder of the path in the request. The READY VOLUME routine is used to determine the subsequently required operations depending upon the location of the designated volume. The IN CELL, IN DRIVE, and SWAP routines are called depending upon the location of the designated volume. The IN CELL routine is called if the designated volume is in its home storage cell 3. The IN DRIVE routine is called if the optical disk including the designated volume is already mounted in a drive 4. The SWAP routine is called if the designated volume is currently active, but has been swapped out of a drive 4 according to the virtual drive option.

The ALLOCATE and FORCE ALLOCATE routines are called by the IN CELL, IN DRIVE, and SWAP ROUTINES as needed. The ALLOCATE routine is used to reserve an unoccupied drive 4 for the mounting of the volume designated in the request. The FORCE ALLOCATE routine is used to reserve an occupied drive 4 for the mounting of the volume designated in the request under the virtual drive option (i.e. by swapping in). The MOUNT routine simply causes picker 5 to retrieve a volume, mount it in a drive 4, and spin it up. The DEMOUNT routine simply causes a mounted optical disk to be spun down, to be demounted by picker 5, and transferred to its home storage cell 3. The MOUNT and DEMOUNT routines include updating of the internal data structures as required and return an error message if they fail to mount or demount a volume, respectively. The RELEASE VOLUME routine is called after the request is processed to determine if preemptive demounting of a volume is appropriate even though library 1 is not idle. The IDLE DEMOUNT routine periodically reviews the activities of drives 4 to determine if any optical disks mounted therein are sufficiently idle as to be preemptively demounted to reduce aging of drives 4.

The following description of the aforementioned routines has been simplified wherever possible for convenience to eliminate features already described herein or known in the art. For example, the information in OLMSCB 110, LCB 111, DCBs 112 and 114, and optical disk map 115 are not always referenced as their location, content, and use have already been described. Similarly, information determined during a routine may be passed on to other routines as such other routines are called, as required for the routines being called to execute. Also, the term "return" is used to refer to an exit from a routine back to the step which called that routine, including some indication to the calling step of the result of the routine. Specific error messages are not provided, but are indicative of the cause of the error. The term "unavailable" is used to refer to a component with an off-line, failed, or locked status, thereby preventing its use. A drive is also considered to be unavailable if its usage attribute is incompatible with that required for a particular request. Finally, references to external drive 10 or the need to flip an optical disk over to ensure mounting of the desired volume have been eliminated for simplification.

Figure 11:
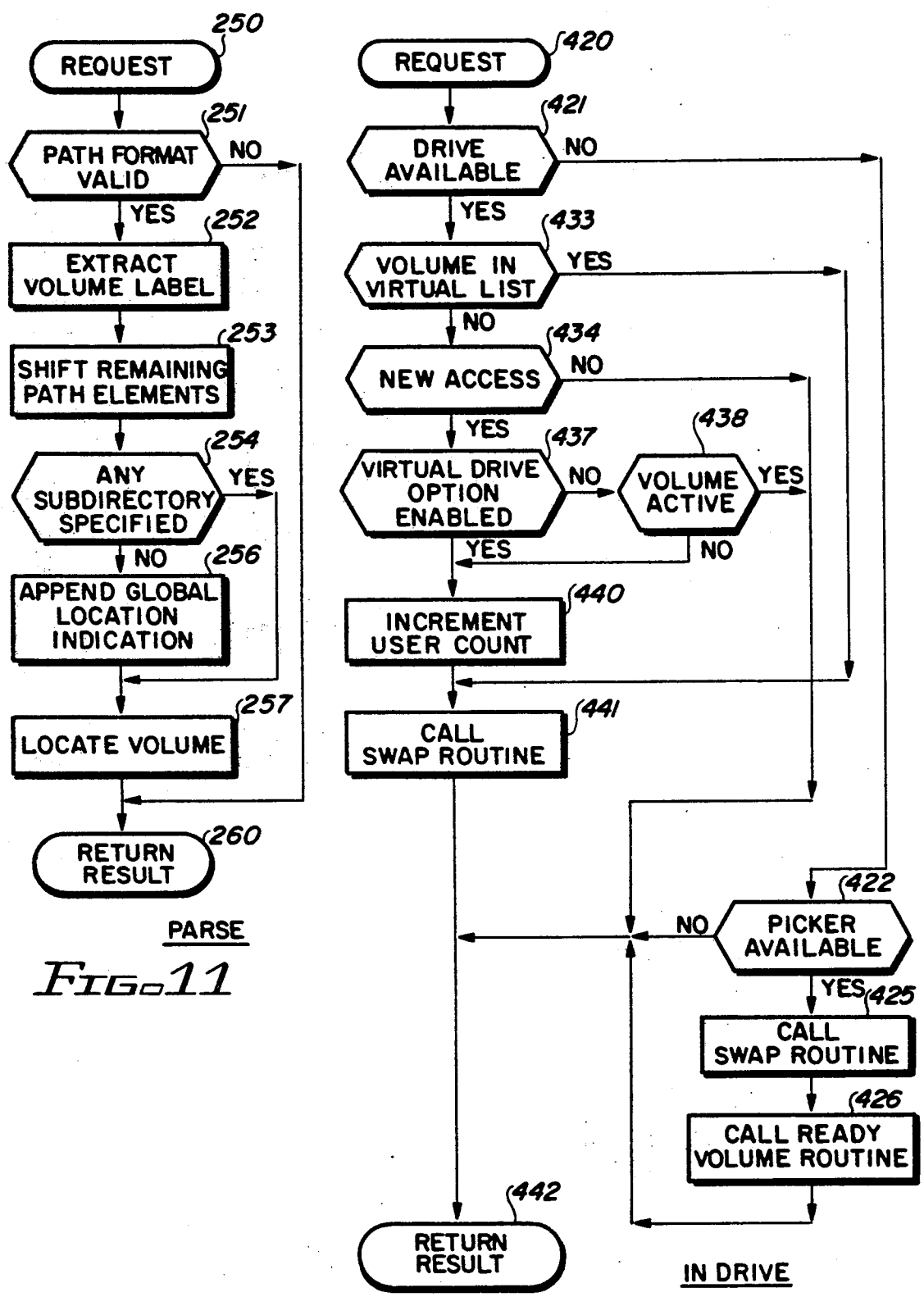
FIG. 11 is a flow chart of the PARSE routine called in FIG. 10.

Referring to FIG. 10, the request to access a designated volume is received from operating system 51 by GLFS request manager 52 at step 200, which then directs steps 201-210 by calling various PCM 53a routines. At step 201, the PARSE routine is called to extract the volume label therefrom and locate the designated volume using the optical disk map. Step 202 branches according to the result of the PARSE routine. If the PARSE routine returns an error message (i.e. is not successfully completed) such error message is returned at step 210. If the PARSE routine is successful, step 203 branches according to the location of the designated volume. If the designated volume is not located in library 1, such volume cannot be accessed therein. The flow therefore skips to step 210 and an error message is returned. If the designated volume is located in library 1, the READY VOLUME routine is called at step 204. Upon completion of the READY VOLUME routine, step 205 branches according to the result of the READY VOLUME routine. If the READY VOLUME routine returns an error message (i.e. is not successfully completed) such error message is returned at step 210. If the READY VOLUME routine is successful, operations on the designated volume according to the request occur at step 207. When such operations complete, the RELEASE VOLUME routine is called at step 208 to determine if preemptive demounting is required. When the RELEASE VOLUME routine completes, the result is returned at step 210. Referring to FIG. 11, the PARSE routine called at step 201 begins at step 250. Step 251 branches according to the validity of the path specified in the request. The validity of the specified path is determined by comparing it to the standard path protocol described earlier. For example, an invalid path format would be one in which the first path element is longer than that permitted for volume labels. If the path format is invalid, the flow skips to step 260 and an error message is returned. If the path format is valid, the first path element (i.e. the volume label 36) is extracted from the path specification and stored at step 252. At step 253, the remaining path elements are shifted to eliminate the first path element from the path specification The remaining path specification now includes designator 35, subdirectory elements 37, and filename and extension 39. Step 254 branches according to the existence of subdirectory elements 37 in the remaining path specification If subdirectory elements 37 remain, the flow skips to step 257. If no subdirectory elements remain, the global indicator "*.*" is appended to the path specification at step 256. At step 257, the path specification and the optical disk map are used to locate the specified volume in library 1. The existence of the global indicator means that no subdirectories were specified in the request; the entire library 1 must be checked to determine the location of the specified volume. When the PARSE routine completes, the result is returned at step 260.

Figure 12:
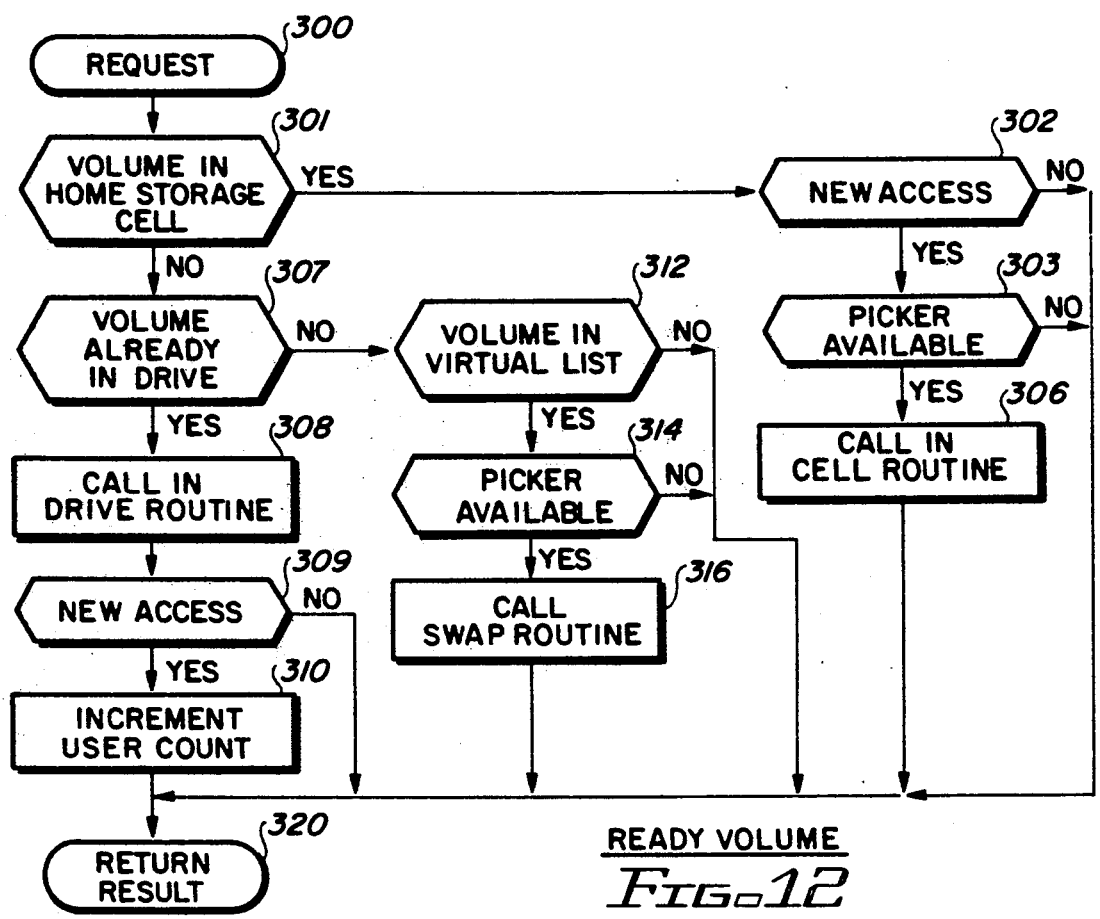
FIG. 12 is a flow chart of the READY VOLUME routine called in FIG. 10.

Referring to FIG. 12, the READY VOLUME routine called at step 204 begins at step 300 and proceeds along different paths depending upon the location of the designated volume. Step 301 branches according to whether the designated volume is currently located in its home storage cell 3. If the designated volume is located in its home storage cell 3, steps 302 and 303 then branch according to whether the request is a new access for the requesting user to the designated volume and according to whether picker 5 is available. If the request is not a new access, or if picker 5 is unavailable, the flow skips to step 320 and an error message is returned. An error message is returned because the designated volume should not be in its home storage cell 3. A volume that is physically but not logically located in its home storage cell 3 (because it is swapped out of a drive 4) will result in step 301 branching to step 307. If the picker 5 is unavailable, an error message is returned at step 320 because mounting of the designated volume cannot occur. If the request is a new access, and picker 5 is available, the IN CELL routine is called at step 306 to attempt to mount the designated volume in a drive 4. Upon completion of the IN CELL routine, the READY VOLUME routine returns at step 320.

If the designated volume is not located in its home storage cell 3 at step 301, the search to locate the current position of such volume continues at step 307. Step 307 branches according to whether the optical disk including the designated volume is already in a drive 4. If such optical disk is in a drive 4, no mount operations are required and the IN DRIVE routine is called at step 308. Upon completion of the IN DRIVE routine step 309 branches according to whether the request is a new access for the requesting user to the designated volume. If the request is not a new access, the flow skips to step 320. If the request is a new access, the user count of the designated volume is incremented at step 310. The READY VOLUME routine returns at step 320.

If the optical disk including the designated volume is not in a drive 4 at step 307 (the designated volume is already known to be in library 1, but has not been located in its home storage cell 3 or a drive 4), it should have been swapped out of a drive 4 according to the virtual drive option. Steps 312 and 313 branch according to whether the designated volume is located in the virtual list and according to the availability of picker 5. If the designated volume is not located in the virtual list, or if picker 5 is unavailable, an error message is returned at step 320. If the designated volume is not located in the virtual list, an error message is returned because such volume cannot be located. If picker 5 is unavailable, an error message is returned because mounting of the designated volume cannot occur. If the designated volume is located in the virtual list, and if picker 5 is available, the SWAP routine is called at step 316. Upon completion of the SWAP routine the READY VOLUME routine returns at step 320.

Figure 13:
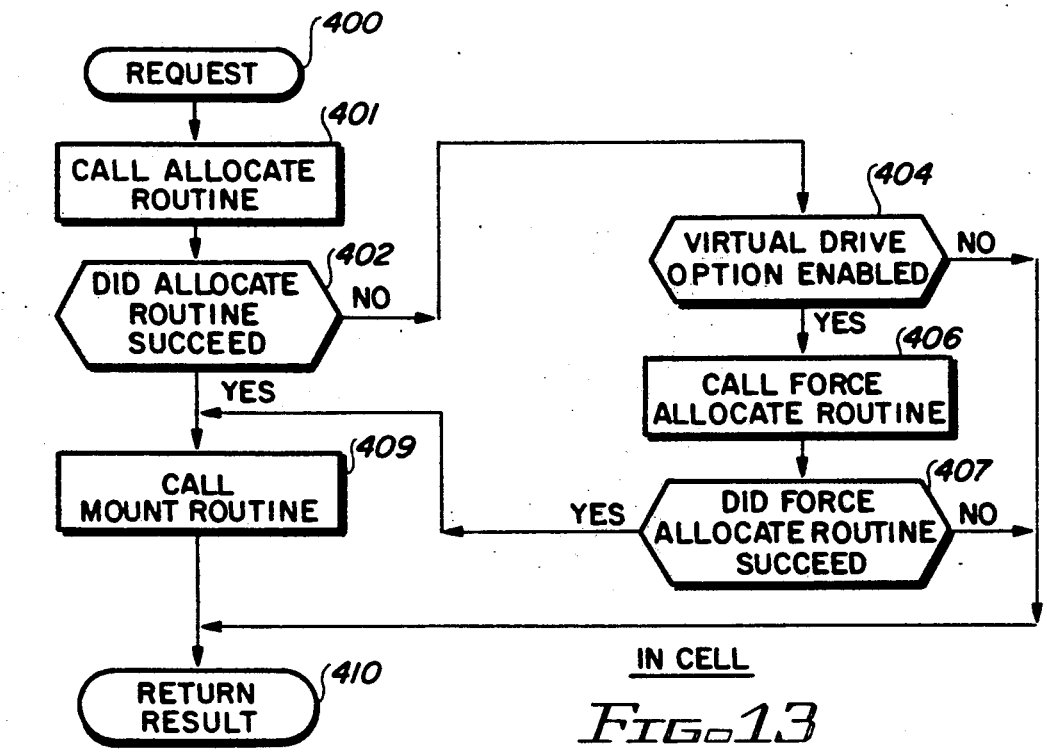
FIG. 13 is a flow chart of the IN CELL routine called in FIG. 12.

Referring to FIG. 13, the IN CELL routine called at step 306 begins at step 400 and proceeds along different paths depending upon the existence of an unoccupied drive 4 in which to mount the volume. At step 401, the ALLOCATE routine is called to reserve a drive 4 for mounting of the volume designated in the request. Step 402 branches according to the results of the ALLOCATE routine. If an unoccupied drive 4 is located and reserved (i.e. the ALLOCATE routine succeeded), the MOUNT routine is called at step 409 to mount the designated volume in the reserved drive 4. If an unoccupied drive 4 is not located and reserved (i.e. an error message is returned), step 404 branches according to whether the virtual drive option is enabled. If the virtual drive option is not enabled, the flow skips to step 410 and the result of the ALLOCATE routine is returned. If the virtual drive option is enabled, the FORCE ALLOCATE routine is called at step 406. Although no unoccupied drive 4 exists, the virtual drive option allows for the swapping in of the designated volume. At step 407, branching occurs to the result of the FORCE ALLOCATE routine. If the FORCE AL- LOCATE routine returns an error message, such result is returned at step 410. If the FORCE ALLOCATE routine successfully swaps out the designated volume, the MOUNT routine is called at step 409. Upon completion of the MOUNT routine the IN CELL routine returns at step 410.

Referring to FIG. 14, the IN DRIVE routine called at step 308 begins at step 420 and proceeds along two basic paths depending upon the availability of the drive 4 in which the designated volume is mounted. Step 421 branches to step 422 if the drive 4 in which the designated volume is mounted is unavailable. Step 422 then branches according to whether picker 5 is available. If picker 5 is unavailable, the flow skips to step 442 and an error message is returned. An error message is returned because the designated volume cannot be accessed in an unavailable drive 4 and cannot be transferred to another drive 4 as picker 5 is also unavailable. If picker 5 is available at step 422, the SWAP routine is called at step 425 to swap the designated volume out of drive 4. Upon completion of the SWAP routine, the READY VOLUME routine is called at step 426. Upon completion of the READY VOLUME routine, the IN DRIVE routine returns at step 442.

If at step 421 the drive 4 in which the designated volume is mounted is available, step 433 branches according to whether the designated volume is located in the virtual list. If the designated volume is located in the virtual list, the flow skips to step 441 to call the SWAP routine to attempt to swap in the designated volume. The swap routine is called because the optical disk including the designated volume is in a drive 4, but the designated volume is swapped out of such drive 4. If the designated volume is not located in the virtual list, branching occurs at step 434 according to whether the request is a new access for the requesting user to the designated volume. If the request is not a new access, an error message is returned at step 442. If the request is a new access, steps 437 and 438 branch according to whether the virtual drive option is enabled and according to whether the designated volume is active (i.e. has a positive user count). If the virtual drive option is not enabled and the designated volume is active, an error message is returned at step 442. Otherwise, the user count of the designated volume is incremented at step 440 and the SWAP routine is called at step 441. Upon completion of the SWAP routine, the IN DRIVE routine returns at step 442.

Figure 15:
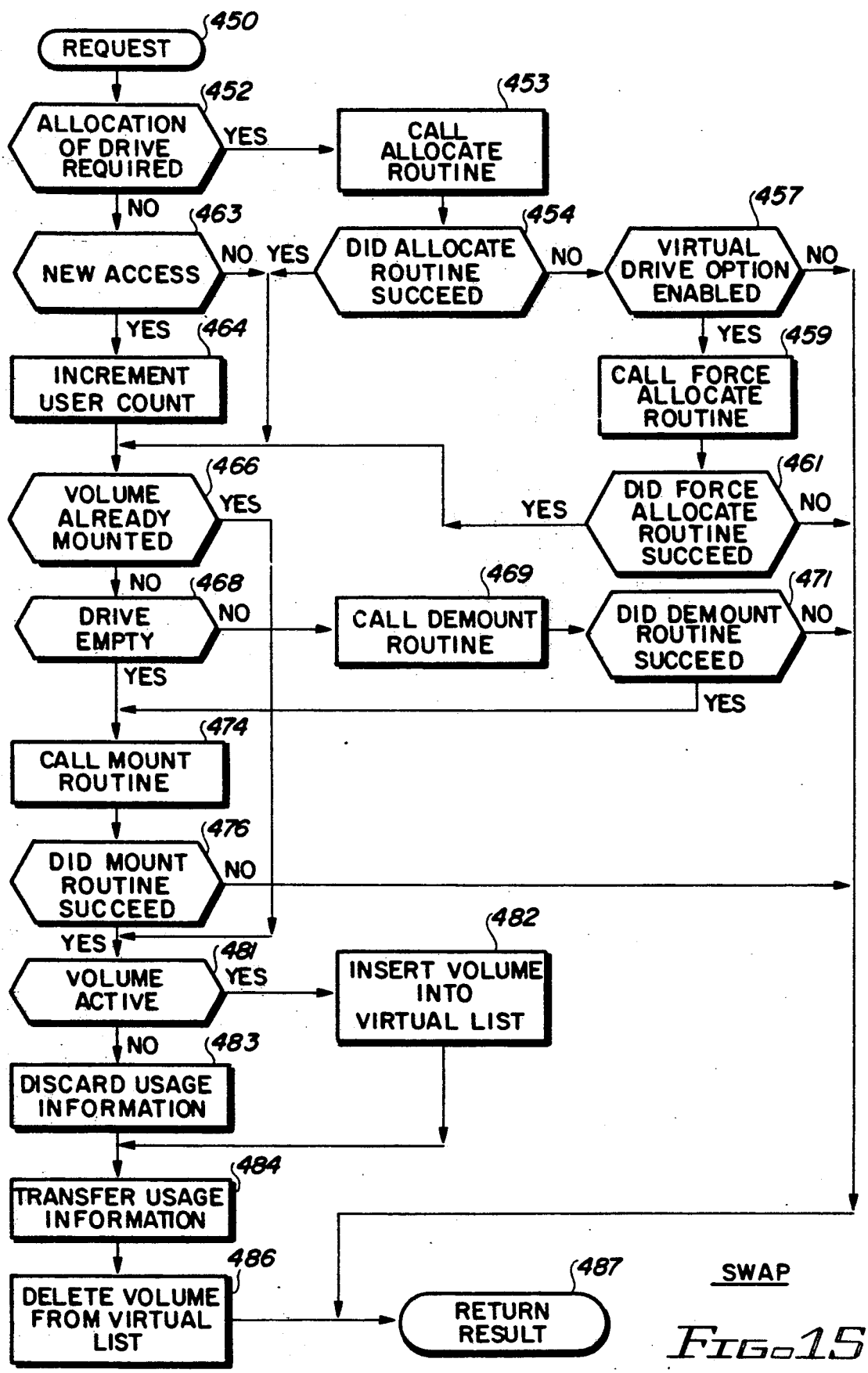
FIG. 15 is a flow chart of the SWAP routine called in FIG. 12.

Referring to FIG. 15, the SWAP routine begins at step 450 and branches at step 452 according to the need to allocate a drive. If no drive 4 needs to be allocated, the flow continues at step 463. Step 463 branches according to whether the request is a new access for the requesting user to the designated volume. If the request is not a new access, the flow skips to step 466. If it is a new access, the user count for the designated volume is incremented at step 464 before proceeding to step 466. If at step 452 a drive 4 needs to be allocated, the ALLOCATE routine is called at step 453. Step 454 branches according to the results of the allocate routine. If the ALLOCATE routine succeeds in locating and reserving an unoccupied drive 4, the flow skips to step 466. If the ALLOCATE routine returns an error message, step 457 branches according to the whether the virtual drive option is enabled. If the virtual drive option is not enabled, the flow skips to step 487 and the result of the ALLOCATE routine is returned. If the virtual drive option is enabled, the FORCE ALLOCATE routine is called at step 459. Step 461 then branches according to the results of the FORCE ALLOCATE routine. If the FORCE ALLOCATE routine returns an error message, the error message is returned at step 487. If the FORCE ALLOCATE routine succeeds, the flow continues at step 466.

At step 466, branching occurs according to whether the designated volume is already mounted in the allocated drive 4. If the designated volume is already mounted in the allocated drive 4, the flow skips to step 481. If the designated volume is not already mounted in the allocated drive drive 4, branching occurs at step 468 depending upon the occupancy status of such drive 4. If such drive 4 is unoccupied, the flow skips to step 474. If such drive 4 is occupied, the optical disk therein is demounted by a call to the DEMOUNT routine at step 469. Step 471 branches according to the results of the DEMOUNT routine. If the DEMOUNT routine returns an error message, the error message is returned at step 487. If the DEMOUNT routine succeeds, the flow continues with a call to the MOUNT routine at step 474. At step 476, branching occurs according to results of the MOUNT routine. If the MOUNT routine returns an error message, the error message is returned at step 487. If the MOUNT routine succeeds in mounting the designated volume, branching occurs at step 481 according to the activity status of any volume demounted from the allocated drive 4 at step 469. If the user count of the demounted volume is positive, the volume specific information in active DCB 114 for the allocated drive 4 for such volume is retained by linking it into the virtual list at step 482 and the flow continues at step 484. If the user count of the demounted volume is not positive, the information in active DCB 114 is discarded at step 483 and the flow continues at step 484. At step 484, the volume specific information in the virtual list for the designated volume is copied into active DCB 114 for the allocated drive 4. At step 486, the information in the virtual list for the designated volume is deleted and the flow returns at step 487. Note that because active DCBs 114 are updated as required at steps 482–484 and 486, such updating otherwise performed during the MOUNT and DEMOUNT routines is inhibited at the calls to such routines at steps 469 and 474.

Referring to FIG. 16, the ALLOCATE routine begins at step 500 and branches at step 502 according to the existence of an empty, available drive 4 in which to mount the designated volume. If there is an empty, available drive 4, the user count for the designated volume is incremented at step 503 in preparation for its being mounted in such drive 4 and the flow skips to step 513. The empty, available drive 4 is at this point reserved for such mounting. If there is more than one empty, available drive, the first such drive located by examining the internal data structures of library 1 is allocated. In alternative embodiments, the choice among multiple empty, available drives could be made using any known scheduling technique, such as FIFO, LIFO, round robin, or minimum picker travel techniques. If there is no empty, available drive 4, steps 506 and 507 branch according to the existence of an available, inactive drive 4 and whether any such inactive drive 4 has been active in the last minimum demount eligibility time W. If there is no available, inactive drive 4, or if such a drive 4 is located but has not been inactive for time W, the flow skips to step 513 and an error message is returned. If there is no available, inactive drive 4, an error message is returned as there is little benefit to interrupting the activity of one of the drives 4 to demount the optical disk therein and subsequently mount the designated volume. If there is an available, inactive drive 4, but no such inactive drive 4 has been inactive for time W, no optical disk is demounted and an error message is returned, thereby preventing churn 1 during piecewise active system applications. If there is an available, inactive drive 4 that has been inactive for time W, the DEMOUNT routine is called to demount the optical disk therein at step 511. If more than one such drive 4 is located, the optical disk in the drive 4 that has been inactive the longest (i.e. the least recently used optical disk) is demounted. At step 512, the user count for the designated volume is incremented in preparation for its being mounted. The ALLOCATE routine returns at step 513.

Minimum demount eligibility time W can be tailored to the operating characteristics of the particular library and its operating environment. When W is zero, step 507 will always branch to step 511 for demounting. The risk is that demounting may occur only to have remounting of the demounted optical disk required shortly thereafter. When W is very large, disks may never be demounted as is desired. In the preferred embodiment W is set to between 0 and 10 seconds to maintain the proper balance among these factors.

Referring to FIG. 17, the FORCE ALLOCATE routine begins at step 520 and branches according to the existence of an available, inactive drive 4 at step 522. If there is no available, inactive drive 4, the flow skips to step 530 and an error message is returned. An error message is returned as there is little benefit to interrupting the activity of one of the drives 4 to demount the optical disk therein and subsequently mount the designated volume. If there is an available, inactive drive 4, steps 524 and 526 branch according to whether any inactive drive 4 has been active in the last minimum demount eligibility time W seconds or whether any inactive drive 4 has been active in the last minimum virtual drive eligibility time V. If no inactive drive 4 has been inactive for the time W and the time V, an error message is returned at step 530. An error message is returned because the risk of churn is considered too high to demount an optical disk. If there is a drive 4 which has not been active within time W and time V, the user count for the designated volume 4 is incremented at step 528 in preparation for its being mounted. At step 529, the SWAP routine is called. Upon completion of the SWAP routine, the FORCE ALLOCATE routine returns at step 530.

Minimum virtual drive eligibility time V can be tailored to the operating characteristics of the particular library and its operating environment. When V is zero, step 526 will always branch to steps 528 and 529 to call the SWAP routine to attempt to demount an optical disk under the virtual drive option. The risk is that demounting may occur only to have remounting of the demounted optical disk required shortly thereafter. When V is very large, step 526 will always branch to step 530, thereby returning from the FORCE ALLOCATE routine. Such a large value of V effectively eliminates the FORCE ALLOCATE routine. In the preferred embodiment V is set to between 0 and 30 seconds to maintain the proper balance among these factors.

Figure 18:
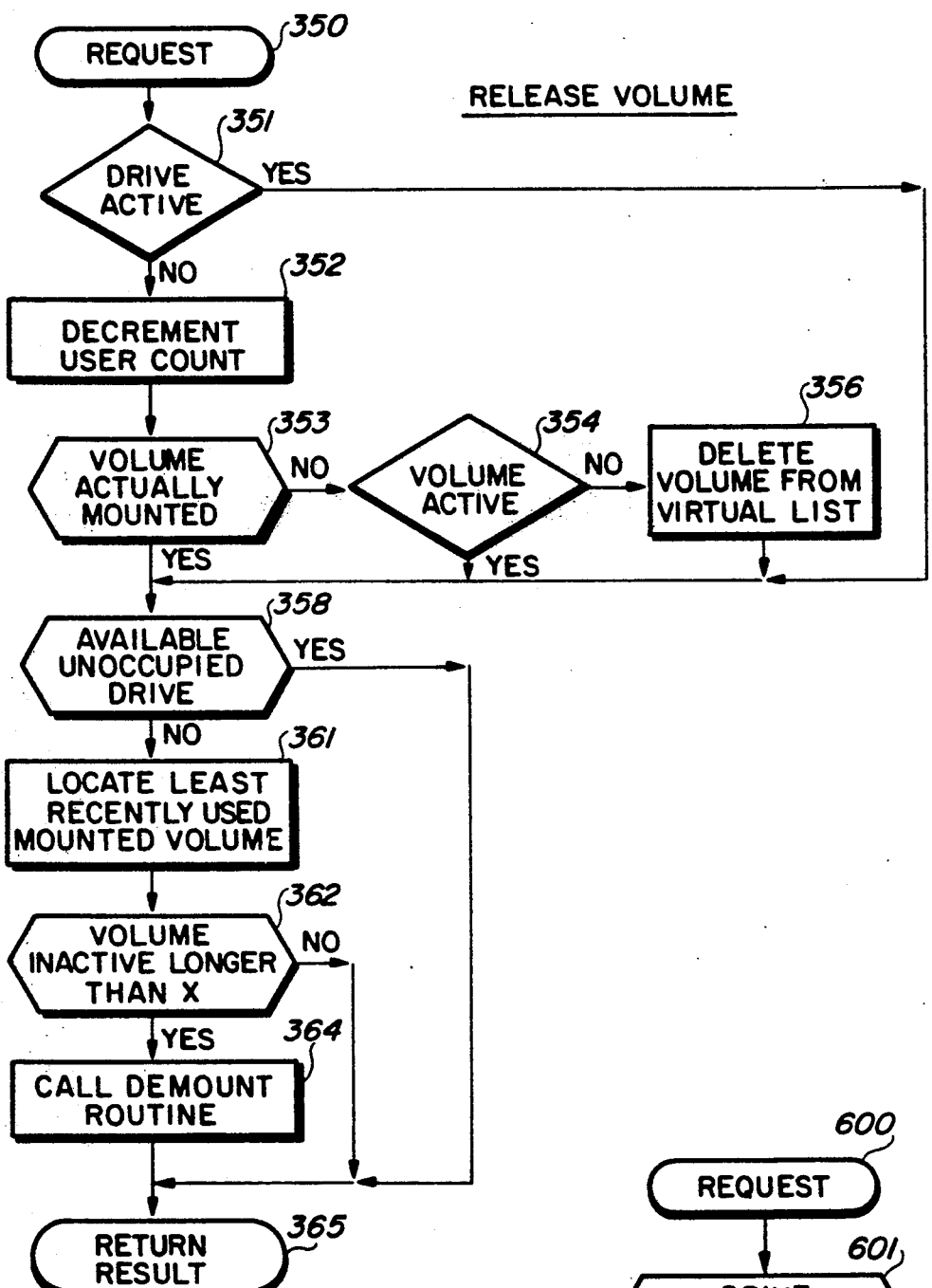
FIG. 18 is a flow chart of the RELEASE VOLUME routine called in FIG. 10.

Referring to FIG. 18, the RELEASE VOLUME routine called at step 208 begins at step 350. Step 351 branches according to the activity of the drive 4 in which the designated volume has been mounted. If the drive 4 is active, the flow skips to step 358. If the drive 4 is inactive, the user count for the drive 4 is decremented at step 352 to reflect the inactivity. Step 353 then branches according to whether the designated volume is actually mounted in a drive 4 or is swapped out under the virtual drive option. If the designated volume is actually mounted in a drive 4, the flow skips to step 358. If the designated volume is swapped out under the virtual drive option, branching occurs at step 354 according to the activity status of the designated volume. If the user count of the designated volume is positive, the flow skips to step 358. If the user count of the designated volume is zero, the access information in the virtual list is no longer required and is discarded at step 356 before proceeding to step 358.

Steps 358-364 determine whether any optical disks in library 1 should be preemptively demounted. Branching occurs at step 358 according to the existence of an available, unoccupied drive 4 in library 1. If there is an available, unoccupied drive 4, the flow skips to step 365 and the RELEASE VOLUME routine returns. Demounting is not required as an unoccupied drive 4 already exists to service a future mount request. If all drives 4 are occupied, the index into the optical disk map for the least recently used volume mounted in an available drive 4 is retrieved at step 361. Branching then occurs at step 362 according to whether such least recently used volume has been active within the last preemptive demount eligibility time X. If such volume has been active in the last time X, demounting is not performed as the risk of churn is considered to be too great and the flow skips to step 365. If such volume has not been active in the last time X, the DEMOUNT routine is called to demount the optical disk including such volume at step 364 before proceeding to step 365. Because accessing data is often associated with accessing data stored nearby, the least recently used volume is considered to be the mounted volume least likely to be accessed next (i.e. the mounted volume least likely to result in churn if demounted). Demounting ensures that an empty drive 4 is available to service the next mount request. Note that the existence of a pending mount request has no relevancy to steps 358-364. Even when no mount request is pending an optical disk can be demounted (i.e. "preemptively" demounted) in anticipation of a future mount request. In alternative embodiments, more than one drive 4 may be emptied when all drives 4 are occupied, but such is not preferred as it unduly reduces the number of optical disks remaining on-line (i.e. mounted and spinning). Upon completion, the RELEASE VOLUME routine returns at step 365.

Preemptive demount eligibility time X can be tailored to the operating characteristics of the particular library and its operating environment. When X is zero, step 362 will always branch to step 364 for preemptive demounting. The risk is that demounting may occur only to have remounting of the demounted disk required shortly thereafter. When X is very large, disks may never be preemptively demounted as is desired. To prevent the demounting at step 511 of most disks otherwise eligible for preemptive demounting at step 364, X should be greater than or equal to W. In the preferred embodiment X is set between 0 and 20 seconds to maintain the proper balance among these factors. Where X is less than W, step 362 should branch according to whether the least recently used volume has been active within W and X. Branching to step 364 should only occur if the least recently used volume has not been active in the last time W and the last time X.

Figure 19:
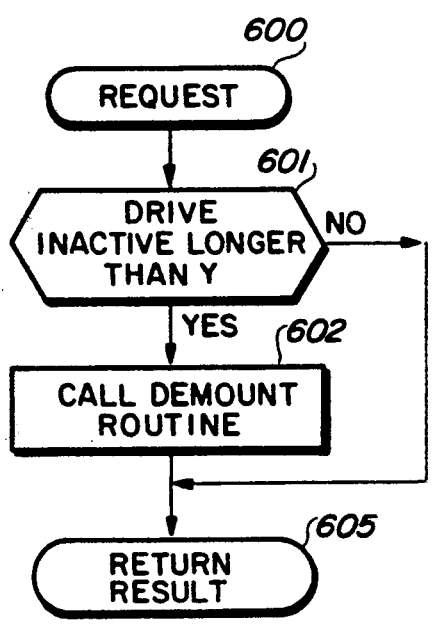
FIG. 19 is a flow chart of the IDLE DEMOUNT routine according to one embodiment of the present invention.

Referring to FIG. 19, the periodic review of the activities of drives 4 to determine if the optical disk in any of occupied drives 4 is sufficiently idle as to be preemptively demounted begins with the periodic interruption of console 11 at step 600. In the preferred embodiment console 11 is interrupted every 10 seconds. The interrupts are issued without regard to the status of library 1 with respect to FIGS. 8-15. At step 601, branching occurs according to the activity status of drives 4 as in step 362, except that the preemptive demount eligibility time X is replaced with a relatively much larger idle demount time Y. If no drive 4 has been inactive for time Y, the flow returns at step 605. Note that because the time Y is much greater than the time X, the determination not to preemptively demount at step 601 has little, if anything, to do with the risk of churn.

If at step 601 any drive has been inactive for time Y, the DEMOUNT routine is called at step 602 to preemptively demount all optical disks mounted in any such inactive drive 4 before proceeding to step 605. The existence of a drive 4 that has been inactive for time Y is considered to be an indication that library 1 is relatively idle. Idle periods may occur during periods of low overall system use, such as nights and weekends in some data processing systems. At such times, it is not desirable to continue to spin the optical disks in drives 4. So long as disks are spinning, the lasers in drives 4 will continue to follow the tracks on the disks, resulting in needless servo action. The drive motors and lasers will work to maintain drives 4 in a state of readiness even though no useful work is being performed, thereby prematurely aging drives 4. Note that preemptive demounting here applies to all optical disks mounted in such inactive drives, not just the least recently used disk, as the need to reduce aging of the drives is considered to outweigh the need to maintain disks on-line when library 1 is relatively idle. Thus, by preemptively demounting certain disks during relatively idle periods, the reliability of library 1 is improved. In an alternative embodiment, the reliability of library 1 could be improved by spinning down such disks without their being demounted and returned to their home storage cell 3.

Idle demount time Y can be tailored to the operating characteristics of library 1 and its operating environment. When Y is zero, the optical disk in any inactive drive 4 will be preemptively demounted from such drive 4. The risk is that preemptive demounting of several disks may occur just before the activity in library 1 increases. When Y is very large, disks may never be preemptively demounted. Such a large value of Y effectively eliminates the IDLE DEMOUNT routine. In the preferred embodiment, Y is set between 10 and 30 minutes to maintain the proper balance among these factors. In an alternative embodiment, no drive 4 is preemptively demounted unless one or more drives 4 are unoccupied and one or more of the mounted drives 4 has been inactive for time Y. The existence of an unoccupied drive 4 would result from preemptive demount operations at steps 358-364. The addition of the need for an unoccupied drive 4 to qualify library 1 as relatively idle reduces the likelihood that demounting under the IDLE DEMOUNT routine will occur just before the activity in library 1 increases.

In an alternative embodiment, library 1 can be set to operate in "fixed" mode or "adaptive" mode, as designated in the system performance file and OLMSCB 110. In fixed mode, library 1 operates as previously described. In adaptive mode, the operator specifies times W, X, and Y and adaptive mode time Z. Z is a predetermined time for comparison with the time since an optical disk was last demounted. At mounting, if the time since a disk was last mounted is less than Z, the remounted disk is considered to be a relatively active disk which cannot be preemptively demounted according to steps 358-364. Demounting of such a disk only occurs as part of the ALLOCATE routine to service a pending mount request, or as part of the IDLE DEMOUNT routine. At mounting, if the time since a disk was last mounted is greater than Z, the remounted disk is considered eligible for preemptive demounting according to steps 358-364. In adaptive mode a disk can have its eligibility for preemptive demounting adjusted as the demand for access to such disk varies over time. The more active disks are dynamically sorted from the less active disks, thereby further decreasing the likelihood of churn.

Adaptive mode time Z can be tailored to the operating characteristics of the particular system. When Z is zero, all remounted disks are eligible for preemptive demounting and library 1 operates in fixed mode. When Z is very large, disks are prevented from being preemptively demounted. In the preferred embodiment, Z is set between 0 and 120 seconds to maintain the proper balance among these factors.

While the invention has been described with respect to a preferred embodiment thereof, it will be understood by those skilled in the art that various changes in detail may be made therein without departing from the spirit, scope, and teaching of the invention. For example, while the invention has been disclosed in the context of an optical disk library, similar consideration may make it equally applicable to other types of libraries. In addition, numerous variations in the libraries may be made, such as the number of drives and storage cells. For example, in an alternative embodiment, library 1 includes 32 storage cells 3 and two drives 4. System controller 17 is located external to housing 2, which is of reduced size. The remaining features of library 1 are essentially unchanged. Also, the prevention of demounting according to the described time parameters may be altered under certain conditions. For example, when machine failure or other off-line conditions occur, it may be desirable to permit demounting although none of drives 4 have been inactive for the appropriate time W or X. Accordingly, the invention disclosed herein is to be limited only as specified in the following claims.

What is claimed is:

1. A method for selecting a data storage medium for demount in an idle automated storage library including a plurality of internal peripheral storage devices, the automated storage library having a plurality of data storage media therein, the method comprising the machine-executed steps of:

determining if all of the internal peripheral storage devices are occupied;

if all of the internal peripheral storage devices are occupied, determining if any internal peripheral storage device has been inactive for a first predetermined time;

if any internal peripheral storage device has been inactive for the first predetermined time, demounting the least recently used data storage medium;

determining if any of the occupied peripheral storage devices have been inactive for a second predetermined time, the second predetermined time significantly longer than the first predetermined time; and if any of the occupied peripheral storage devices have been inactive for the second predetermined time, demounting the data storage medium in each of the occupied peripheral storage devices determined to have been inactive for the second predetermined time.

2. The method of claim 1 wherein the first predetermined time is between 0 and 20 seconds and the second predetermined time is between 10 and 30 minutes.

3. The method of claim 2 wherein the aforementioned machine-executed steps are periodically repeated.

4. The method of claim 1 wherein the aforementioned machine-executed steps are periodically repeated.

5. A method for selecting data storage disks for demount in an idle automated disk library including a plurality of internal disk drives, the automated disk library having a plurality of data storage disks therein, the method comprising the machine-executed steps of:

determining if any occupied internal disk drives have been inactive for a predetermined time; and if any of the occupied internal disk drives have been inactive for the predetermined time, spinning down but not demounting the data storage disk in each of the occupied disk drives determined to have been inactive for the predetermined time.

6. The method of claim 5 wherein the machine-executed step of determining if any occupied internal disk drives have been inactive for the predetermined time occurs periodically.

7. The method of claim 6 wherein the predetermined time is between 10 and 30 minutes.

8. The method of claim 5 wherein the predetermined time is between 10 and 30 minutes.

9. An automated disk library comprising:

a plurality of internal disk drives, each internal disk drive capable of having a data storage disk mounted therein;

a plurality of storage cells, each storage cell capable of storing one data storage disk therein;

a picker for transferring a data storage disk between any internal disk drive and any storage cell; and machine-executed means for commanding that the data storage disk in each internal disk drive determined to have been inactive for a predetermined time be spun down but not demounted, the machine-executed means connected to the each internal disk drive.

10. The automated storage library of claim 9 wherein the predetermined time is between 10 and 30 minutes.

11. The automated storage library of claim 9 wherein the machine-executed means periodically commands that the data storage disk in each internal disk drive determined to have been inactive for a predetermined time be spun down but not demounted.

12. The automated storage library of claim 11 wherein the predetermined time is between 10 and 30 minutes.

* * * * *